US012798487B2

(12) United States Patent
Nomoto et al.

(10) Patent No.: US 12,798,487 B2
(45) Date of Patent: Nov. 17, 2026

(54) VEHICLE CONSOLE

(71) Applicant: TOYODA GOSEI CO., LTD., Kiyosu (JP)

(72) Inventors: Naoki Nomoto, Kiyosu (JP); Masanori Mizuno, Kiyosu (JP); Kazuya Izawa, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 242 days.

(21) Appl. No.: 18/733,069

(22) Filed: Jun. 4, 2024

(65) Prior Publication Data

US 2024/0424993 A1 Dec. 26, 2024

(30) Foreign Application Priority Data

Jun. 23, 2023 (JP) ................................. 2023-103468
Sep. 14, 2023 (JP) ................................. 2023-149379

(51) Int. Cl.
*B60R 7/04* (2006.01)
*B60N 2/75* (2018.01)
*B60N 3/00* (2006.01)
*B60R 11/00* (2006.01)

(52) U.S. Cl.
CPC ................ *B60R 7/04* (2013.01); *B60N 2/773* (2018.02); *B60N 2/793* (2018.02); *B60N 3/001* (2013.01)

(58) Field of Classification Search
CPC ... B60R 7/04; B60R 2011/0007; B60N 2/773; B60N 2/793; B60N 3/001; B60N 3/002; E05Y 2900/538
USPC ....................................................... 296/24.34
See application file for complete search history.

(56) References Cited

U.S. PATENT DOCUMENTS

| | | | | |
|---|---|---|---|---|
| 4,934,750 | A * | 6/1990 | Eichler | E05B 83/32 297/188.19 |
| 6,032,587 | A * | 3/2000 | Salenbauch | B60N 3/002 108/44 |
| 8,899,651 | B2 * | 12/2014 | Schulz | B60N 3/102 296/97.8 |
| 10,919,426 | B1 * | 2/2021 | Campagnone | B60R 7/04 |

(Continued)

FOREIGN PATENT DOCUMENTS

| | | |
|---|---|---|
| JP | H04-104031 U | 9/1992 |
| JP | 2006-036090 A | 2/2006 |

(Continued)

OTHER PUBLICATIONS

Office Action mailed on May 12, 2026 for the corresponding Japanese patent application No. 2023-149379 (and an English machine translation).

(Continued)

*Primary Examiner* — Gregory A Blankenship
(74) *Attorney, Agent, or Firm* — Posz Law Group, PLC

(57) ABSTRACT

A vehicle console is configured to be arranged adjacent to a vehicle seat in a width direction of the vehicle seat. The vehicle console includes a console body, an armrest slidable relative to the console body, and a table accommodated in the armrest. The armrest is configured to be slidable, independently of the table, between a first position at which the armrest accommodates the table and a second position, located rearward from the first position in a front-rear direction of the vehicle seat, at which the armrest exposes the table.

6 Claims, 15 Drawing Sheets

(56) References Cited

U.S. PATENT DOCUMENTS

| | | | | |
|---|---|---|---|---|
| 12,377,787 | B2 * | 8/2025 | Watanabe | B60N 3/002 |
| 2006/0108816 | A1 * | 5/2006 | Radu | B60N 2/753 296/24.34 |
| 2010/0072767 | A1 * | 3/2010 | D'Alessandro | B60N 2/793 296/37.8 |
| 2010/0201147 | A1 * | 8/2010 | Jones | B60N 2/777 296/24.34 |
| 2013/0249231 | A1 * | 9/2013 | Winiger | B60N 3/101 296/24.34 |
| 2014/0138975 | A1 * | 5/2014 | Washio | B60N 2/773 296/24.34 |
| 2015/0115641 | A1 * | 4/2015 | Inoue | B60N 2/793 296/37.8 |
| 2015/0258923 | A1 * | 9/2015 | Skapof | B60R 7/04 296/24.34 |
| 2016/0355110 | A1 * | 12/2016 | Bozio | B60N 2/793 |
| 2017/0306664 | A1 * | 10/2017 | Saikawa | B60N 2/793 |
| 2017/0341544 | A1 * | 11/2017 | Bozio | B60N 2/793 |
| 2018/0222393 | A1 * | 8/2018 | Stiver | B60R 7/04 |
| 2018/0304790 | A1 * | 10/2018 | Patil | B60N 2/793 |
| 2018/0319305 | A1 * | 11/2018 | White | B60N 2/753 |
| 2019/0248261 | A1 * | 8/2019 | Li | B60R 7/04 |
| 2021/0039559 | A1 * | 2/2021 | Santillan Gutierrez | B60R 7/04 |
| 2023/0125485 | A1 * | 4/2023 | Nakamura | B60N 3/101 296/24.33 |
| 2023/0286440 | A1 * | 9/2023 | Watanabe | B60N 2/79 |
| 2024/0083321 | A1 * | 3/2024 | Thomas | B60N 2/77 |
| 2024/0424992 | A1 * | 12/2024 | Nomoto | B60N 3/101 |
| 2024/0424993 | A1 * | 12/2024 | Nomoto | B60N 3/001 |
| 2025/0058687 | A1 * | 2/2025 | Seo | B60N 2/757 |
| 2025/0289373 | A1 * | 9/2025 | Shimizu | B60N 2/793 |

FOREIGN PATENT DOCUMENTS

| | | | |
|---|---|---|---|
| JP | 2008-087732 | A | 4/2008 |
| JP | 2011068309 | A | 4/2011 |
| JP | 2019-077272 | A | 5/2019 |
| WO | 2019028297 | A1 | 2/2019 |

OTHER PUBLICATIONS

Office Action dated Feb. 17, 2026 for the corresponding Japanese Patent Application No. 2023-103468 (and an English machine translation thereof).

* cited by examiner

VEHICLE CONSOLE

CROSS-REFERENCE TO RELATED APPLICATIONS

This application is based upon and claims the benefit of priority from prior Japanese Patent Application No. 2023-103468, filed on Jun. 23, 2023, and prior Japanese Patent Application No. 2023-149379, filed on Sep. 14, 2023, the entire contents of each of which are incorporated herein by reference.

BACKGROUND

1. Field

The following description relates to a vehicle console.

2. Description of Related Art

Japanese Laid-Open Patent Publication No. 2019-77272 discloses an armrest. The armrest includes an accommodation recess and a lid that opens and closes an upper opening of the accommodation recess. A table is coupled to the lid. The table is configured to be switchable between an accommodation position at which the table is accommodated in the lid and a usage position at which the table is exposed from the lid by sliding frontward from the accommodation position.

Japanese Laid-Open Patent Publication No. 2008-87732 discloses a typical vehicle console. This vehicle console includes a box body having an upper opening, and a lid supported by the box body in a manner allowing for opening and closing of the upper opening of the box body by pivoting in the vertical direction. The lid includes a table configured to be pulled toward the front of the vehicle. The table is used when pulled out from the lid.

Vehicle consoles in recent years include functional parts, located frontward from the armrest, such as a cup holder and a console compartment into which items are placed. When the above-described typical armrest is applied to such a console, there will be, for example, the following problem. Specifically, since switching the table from the accommodation position to the usage position is achieved through a forward sliding movement of the table, switching to the usage position is difficult when the table interferes with items. This may adversely affect the convenience of the table. Thus, there is room for improvement in enhancing the convenience of the table in the vehicle console.

Further, in a vehicle console as disclosed in Japanese Laid-Open Patent Publication No. 2008-87732, while the table is in use, items on the table must first be removed and the table is accommodated in the lid when accessing an accommodation portion in a box body. Then, when the lid is pivoted to open the upper opening of the box body, the accommodation portion in the box body is accessible from the upper opening. In this manner, while the table is in use, the lid cannot be pivoted to open the upper opening of the box body, resulting in poor usability of the vehicle console described above. Thus, there is room for improvement in enhancing the usability of the vehicle console.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a vehicle console is configured to be arranged adjacent to a vehicle seat in a width direction of the vehicle seat. The vehicle console includes a console body, an armrest slidable relative to the console body, and a table accommodated in the armrest. The armrest is configured to be slidable, independently of the table, between a first position at which the armrest accommodates the table and a second position, located rearward from the first position in a front-rear direction of the vehicle seat, at which the armrest exposes the table.

In another general aspect, a vehicle console is configured to be arranged between adjacent seats in a passenger compartment. The vehicle console includes a box body including an upper opening and an inner accommodation portion, a lid pivotably attached to the box body and configured to be pivotable between a closing position at which the lid closes the upper opening and an opening position at which the lid opens the upper opening, and a table configured to be movable, when the lid is at the closing position, between an accommodation position at which the table is accommodated and supported by the lid and a usage position at which the table is pulled out from the lid and supported by the box body.

Other features and aspects will be apparent from the following detailed description, the drawings, and the claims.

BRIEF DESCRIPTION OF THE DRAWINGS

FIG. 9 is viewed from the left side.

FIG. 10 is viewed from the rear side.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

First Embodiment

A vehicle console according to a first embodiment will now be described with reference to FIGS. 1 to 7.

In the following description, the direction in which a vehicle 10 advances forward will be referred to as the front, and the reverse direction will be referred to as the rear. The vertical direction refers to the vertical direction of the vehicle 10, and the right-left direction refers to the vehicle width direction that agrees with the right-left direction when the vehicle 10 is advancing forward.

Vehicle Console 20

Figure 1:
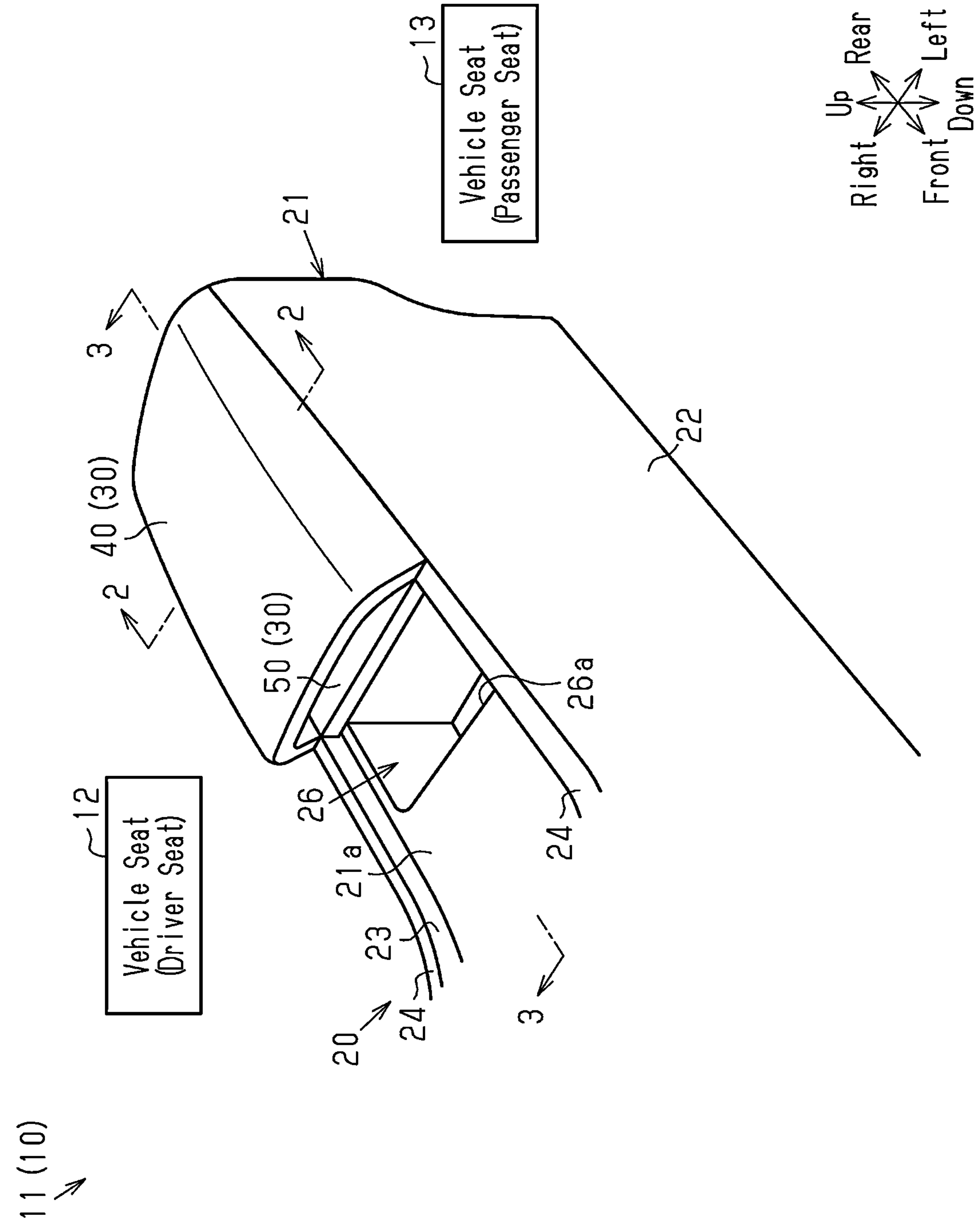
FIG. 1 is a perspective view of a vehicle console according to a first embodiment.

As shown in FIG. 1, two vehicle seats 12 and 13 are arranged as front seats spaced apart from each other in the right-left direction inside a passenger compartment 11 of the vehicle 10. The vehicle seat 12 on the right serves as a driver seat on which an occupant (driver) is seated. The vehicle seat 13 on the left serves as a passenger seat on which an occupant (passenger) is seated.

The vehicle seats 12 and 13 are arranged so that backrests face forward. The front-rear direction of the vehicle seats 12 and 13 arranged in this manner coincides with the front-rear direction of the vehicle 10. The width direction of the vehicle seats 12 and 13 coincides with the right-left direction of the vehicle 10.

A vehicle console (also referred to as a center console, a floor console, or the like) 20 that serves as a box-shaped accommodation unit is placed between the vehicle seats 12 and 13. In other words, the vehicle console 20 is arranged adjacent to each of the vehicle seats 12 and 13 in the right-left direction.

In the following description of each portion of the vehicle console 20, the central portion in the right-left direction (width direction of vehicle seats 12 and 13) is used as a reference. In the right-left direction, the direction toward the central portion may be referred to as "inside," "inward," "inner side," or the like, and the direction away from the central portion may be referred to as "outside," "outward," "outer side," or the like.

The vehicle console 20 includes a console body 21 and a lid 30.

Each component will now be described in details.

Console Body 21

Figure 2:
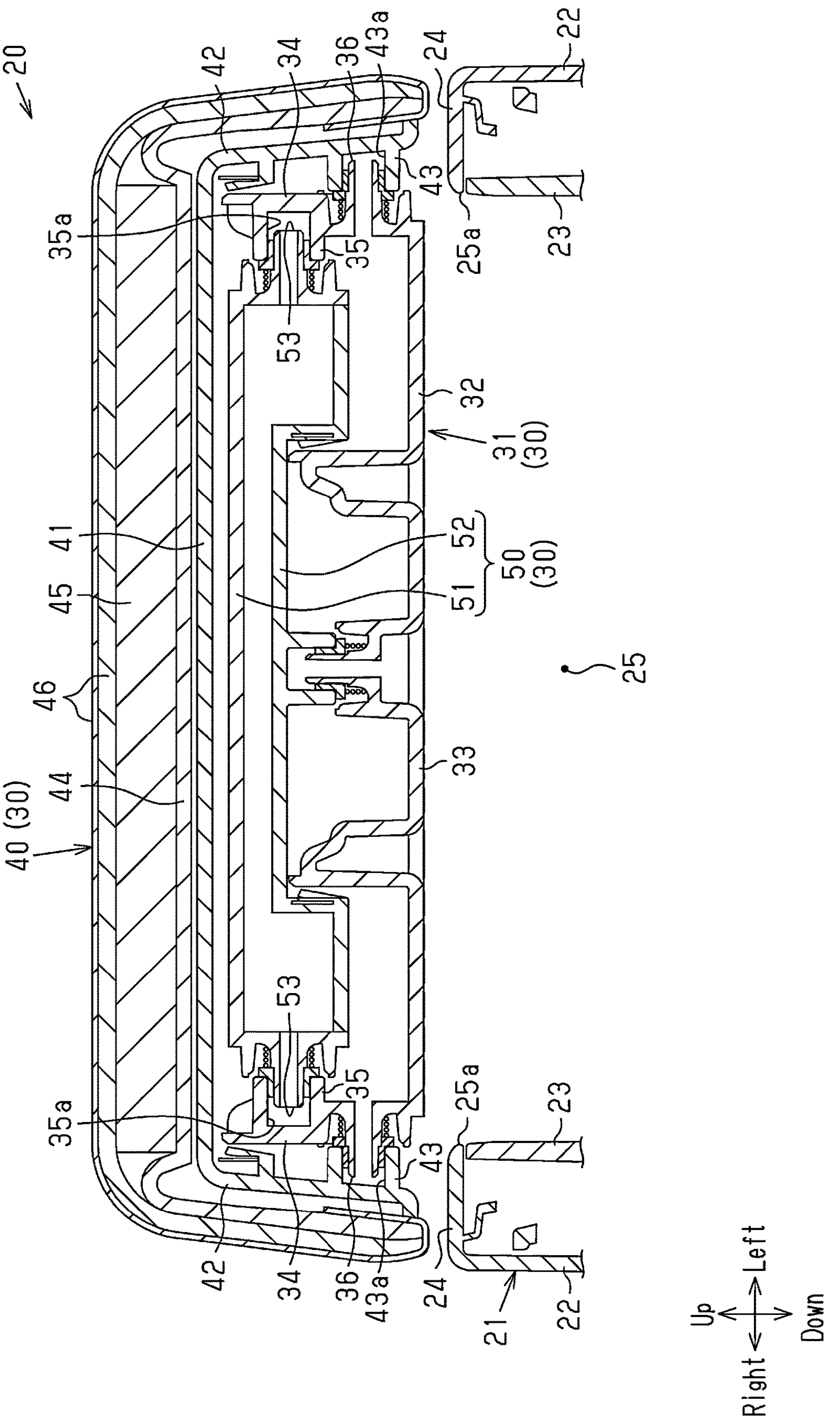
FIG. 2 is a cross-sectional view taken along line 2-2 of FIG. 1.
Figure 3:
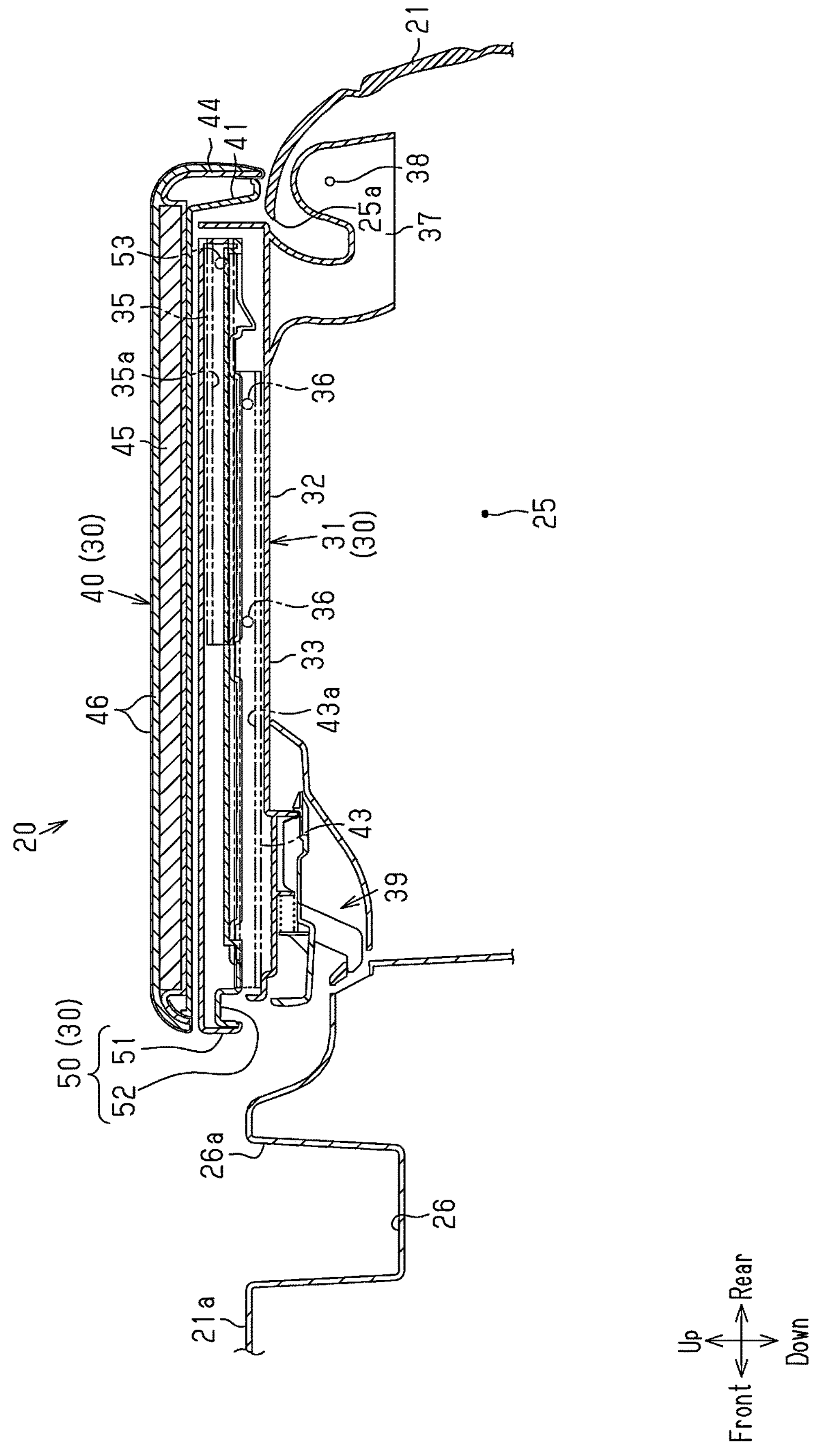
FIG. 3 is a cross-sectional view taken along line 3-3 of FIG. 1.

As shown in FIGS. 1 to 3, the console body 21 is a framework of the vehicle console 20. The console body 21 is made of, for example, a resin material and formed in an elongated shape that is longer in the front-rear direction than in the right-left direction.

The opposite sides of the console body 21 on the right and left are formed by outer walls 22.

An inner wall 23 is arranged at a location spaced inward from each outer wall 22.

As shown in FIGS. 2 and 3, a recess 25 having an opening 25*a* is arranged in an upper surface 21*a* of the console body 21 between the inner walls 23. Items can be placed in and taken out of the recess 25 through the opening 25*a*.

As shown in FIGS. 1 and 3, a recess 26 having an opening 26*a* is arranged in the upper surface 21*a* at a location adjacent to the front of the recess 25 between the inner walls 23. Small items can be placed in and taken out of the recess 26 through the opening 26*a*. The area of the opening 26*a* is less than the area of the opening 25*a*. The volume of the recess 26 is less than the volume of the recess 25.

As shown in FIGS. 1 and 2, upper walls 24 are arranged between the upper ends of the outer walls 22 and the inner walls 23, which are adjacent to each other, to cover a greater portion in the front-rear direction.

Lid 30

As shown in FIGS. 1 to 3, the lid 30 is attached to the console body 21 to open and close the opening 25*a*. The lid 30 includes a hinge member 31, an armrest 40, and a table 50. A position at which the lid 30 closes the opening 25*a* will be referred to as a closed position (refer to FIG. 1). A position at which the lid 30 opens the opening 25*a* will be referred to as an open position (refer to FIG. 6).

Hinge Member 31

As shown in FIGS. 2 and 3, the hinge member 31 includes a base 32 and a support 37. The bottom of the base 32 includes a bottom plate 33 that is rectangular in plan view. The bottom plate 33 forms the bottom surface of the lid 30.

The base 32 includes two side plates 34 at the opposite sides in the right-left direction (refer to FIG. 2).

The upper portion of an inner surface of each side plate 34 includes an inner lateral rail 35 that defines an inner lateral guide groove 35*a* extending in the front-rear direction.

Each inner lateral guide groove 35*a* is open inward.

The lower portion of the outer surface of each side plate 34 includes projections 36 projecting outward from multiple locations, e.g., two locations in the front-rear direction.

As shown in FIG. 3, the support 37 is connected to the rear end of the bottom plate 33. The support 37 is supported by the console body 21 to be pivotable about an axis 38 extending in the right-left direction. Specifically, the support 37 is supported between the inner walls 23 of the console body 21.

The hinge member 31 pivots about the axis 38 with the support 37 to allow the lid 30 to pivot between the closed position and the open position.

A latch mechanism 39 is arranged below the front portion of the base 32. The latch mechanism 39 is configured to engage (lock) the console body 21 to restrict pivoting of the lid 30 about the axis 38 when the lid 30 is at the closed position. The latch mechanism 39 is configured to allow the lid 30 to pivot about the axis 38 when the engagement (lock) is canceled.

Armrest 40

As shown in FIGS. 2 and 3, the framework of the armrest 40 includes an armrest inner member 41 and an armrest outer member 44 that covers the armrest inner member 41. A pad 45 is arranged on the armrest outer member 44. Further, the armrest outer member 44 and the pad 45 are covered by an upholstery material 46.

The armrest inner member 41 includes two side plates 42 at the opposite sides in the right-left direction (refer to FIG. 2). The lower portion of an inner surface of each side plate 42 includes an outer lateral rail 43 that defines an outer lateral guide groove 43*a* extending in the front-rear direction. Each outer lateral guide groove 43*a* is open inward. The projections 36 of the hinge member 31 are inserted into the corresponding outer lateral guide grooves 43*a*. Thus, the armrest 40 is supported by the hinge member 31 to be slidable in the front-rear direction.

As shown in FIGS. 1 to 5, the armrest 40 is configured to be slidable between a first position and a second position (refer to FIG. 4) located rearward from the first position in the front-rear direction by changing the position of the projections 36 relative to the outer lateral guide grooves 43*a* of the armrest inner member 41.

At the first position, the armrest 40 is substantially positioned above the base 32 of the hinge member 31 (refer to FIG. 3). At the second position, the front portion of the armrest 40 is positioned above the rear portion of the base 32 (refer to FIG. 5).

Figure 6:
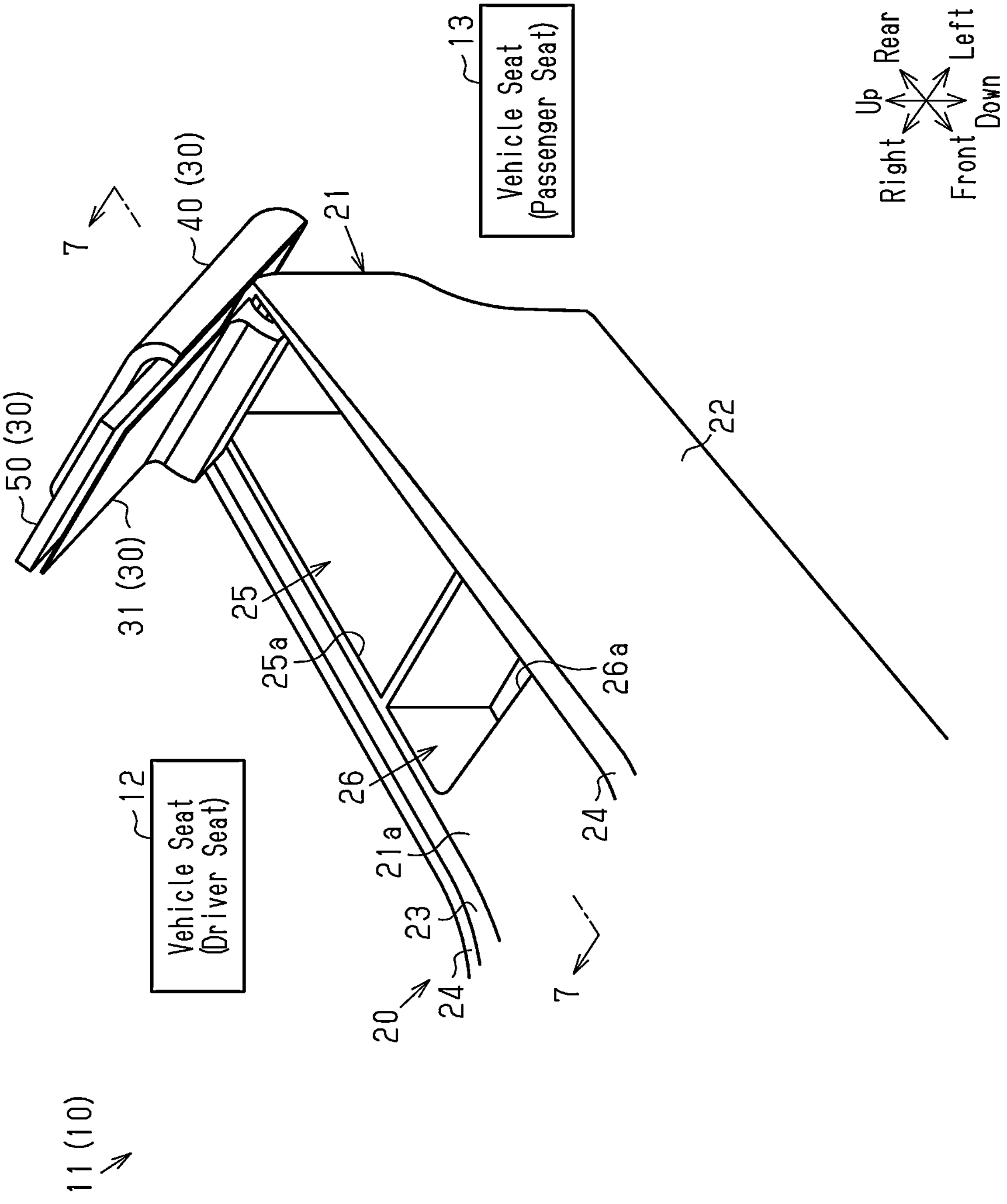
FIG. 6 is a perspective view showing a state in which a lid is pivoted from the state shown in FIG. 4 to an open position.
Figure 7:
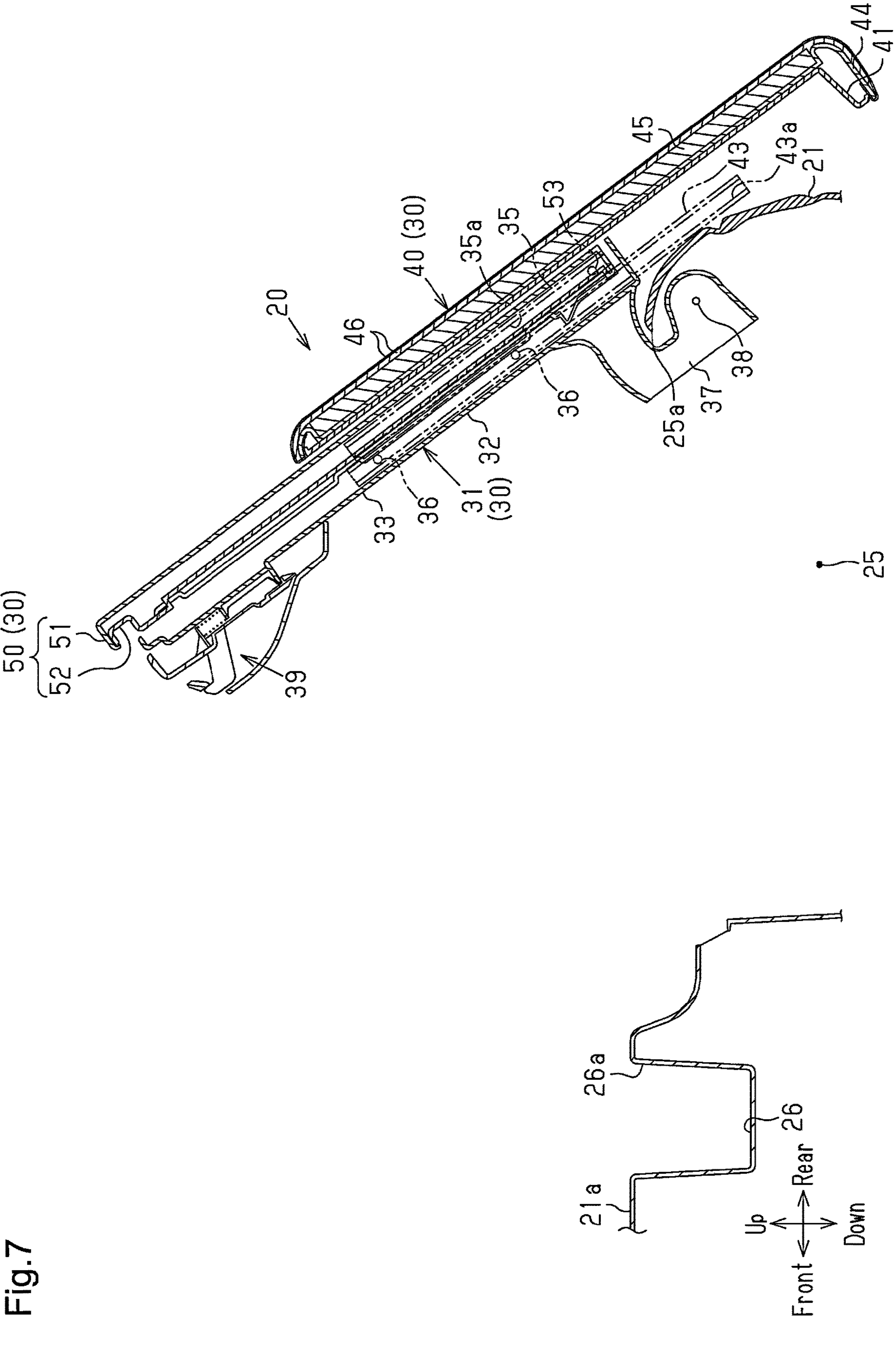
FIG. 7 is a cross-sectional view taken along line 7-7 of FIG. 6.

FIGS. 6 and 7 show a state in which the lid 30 is pivoted from the closed position to the open position when the armrest 40 is at the second position. The armrest 40 and the console body 21 are configured not to interfere with each other when the lid 30 pivots about the axis 38 regardless of any position of the armrest 40 between the first position and the second position (refer to FIG. 7). Thus, the lid 30 is pivotable between the closed position and the open position regardless of any position of the armrest 40 between the first position and the second position.

Table 50

As shown in FIGS. 2 and 3, the table 50 includes an upper table member 51 and a lower table member 52 arranged in the vertical direction. The table 50 is formed by coupling the upper table member 51 and the lower table member 52 to each other.

The table 50 is rectangular with a greater dimension in the front-rear direction than in the right-left direction in plan view.

The opposite sides of the table 50 on the right and left include projections 53 projecting outward.

The projections 53 are inserted into the inner lateral guide grooves 35*a* of the inner lateral rails 35. Thus, the table 50 is supported by the hinge member 31.

As shown in FIG. 3, substantially the entire table 50 is positioned above the base 32.

As shown in FIGS. 1 to 5, the table 50 is configured to be switchable between an accommodation state in which the table 50 is accommodated in the armrest 40 and a usage state (refer to FIG. 4) in which the upper surface of the table 50 exposed from the armrest 40 can be used as a table surface.

When the table 50 is in the accommodation state, the table 50 is accommodated between the armrest 40 and the base 32 of the hinge member 31. The entire table 50 is covered from above by the armrest 40 at the first position (refer to FIG. 3). When the table 50 is in the usage state, the rear portion of the table 50 is covered by the armrest 40 at the second position, and the front portion of the table 50 is exposed (refer to FIG. 5). As described above, in the present embodiment, the table 50 is switched between the accommodation state and the usage state by the armrest 40 sliding between the first position and the second position independently of the table 50.

The present embodiment has the following advantages.

(1) The vehicle console 20 includes the armrest 40 slidable relative to the console body 21.

With such a structure, the occupant can rest their elbow on the armrest 40 to alleviate the load on their shoulder supporting their arm.

(2) The armrest 40 is configured to be slidable, independently of the table 50, between the first position at which the armrest 40 accommodates the table 50 and the second position, located rearward from the first position in the front-rear direction, at which the armrest 40 exposes the table 50.

Figure 4:
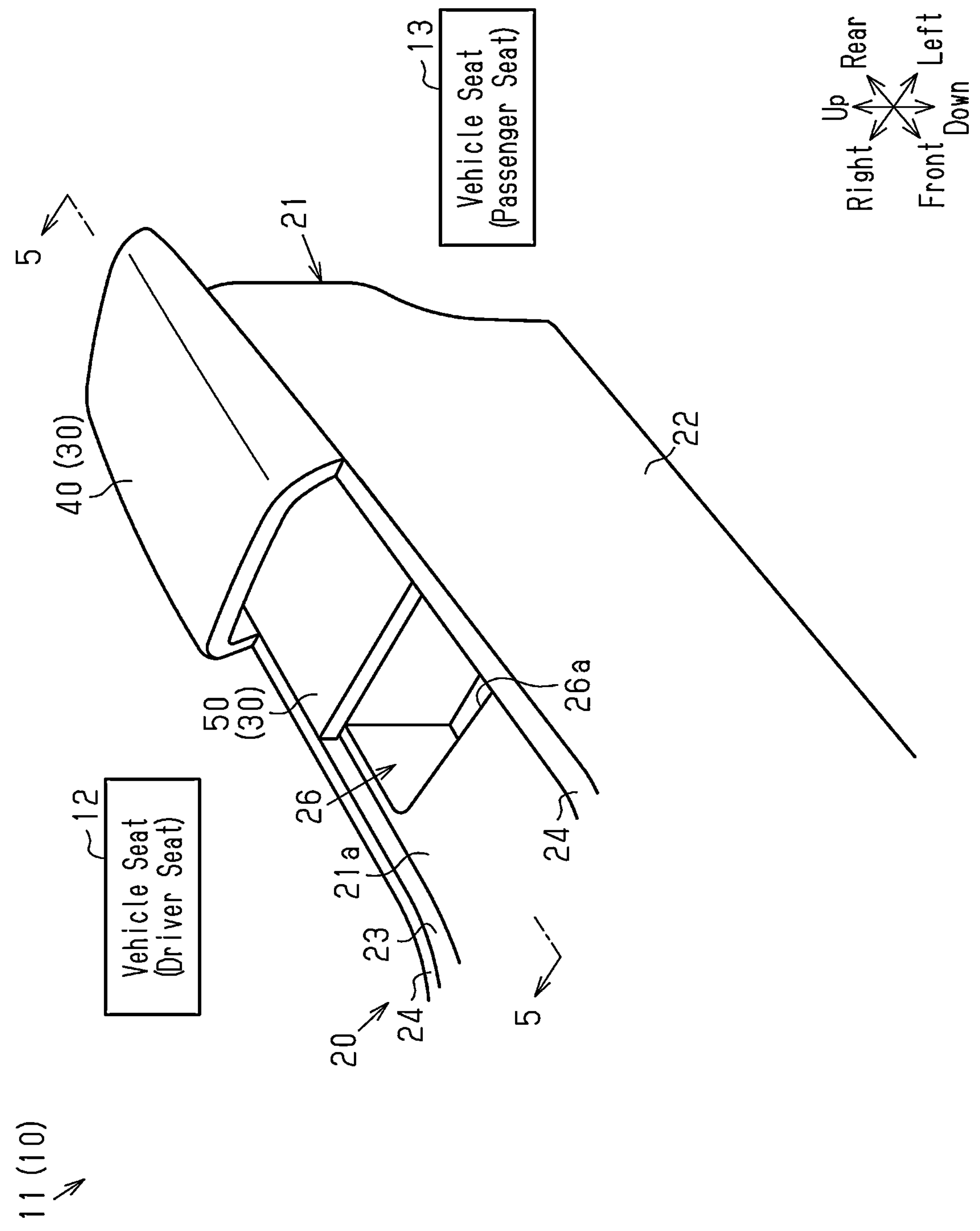
FIG. 4 is a perspective view of the vehicle console of FIG. 1 when a table is exposed.
Figure 5:
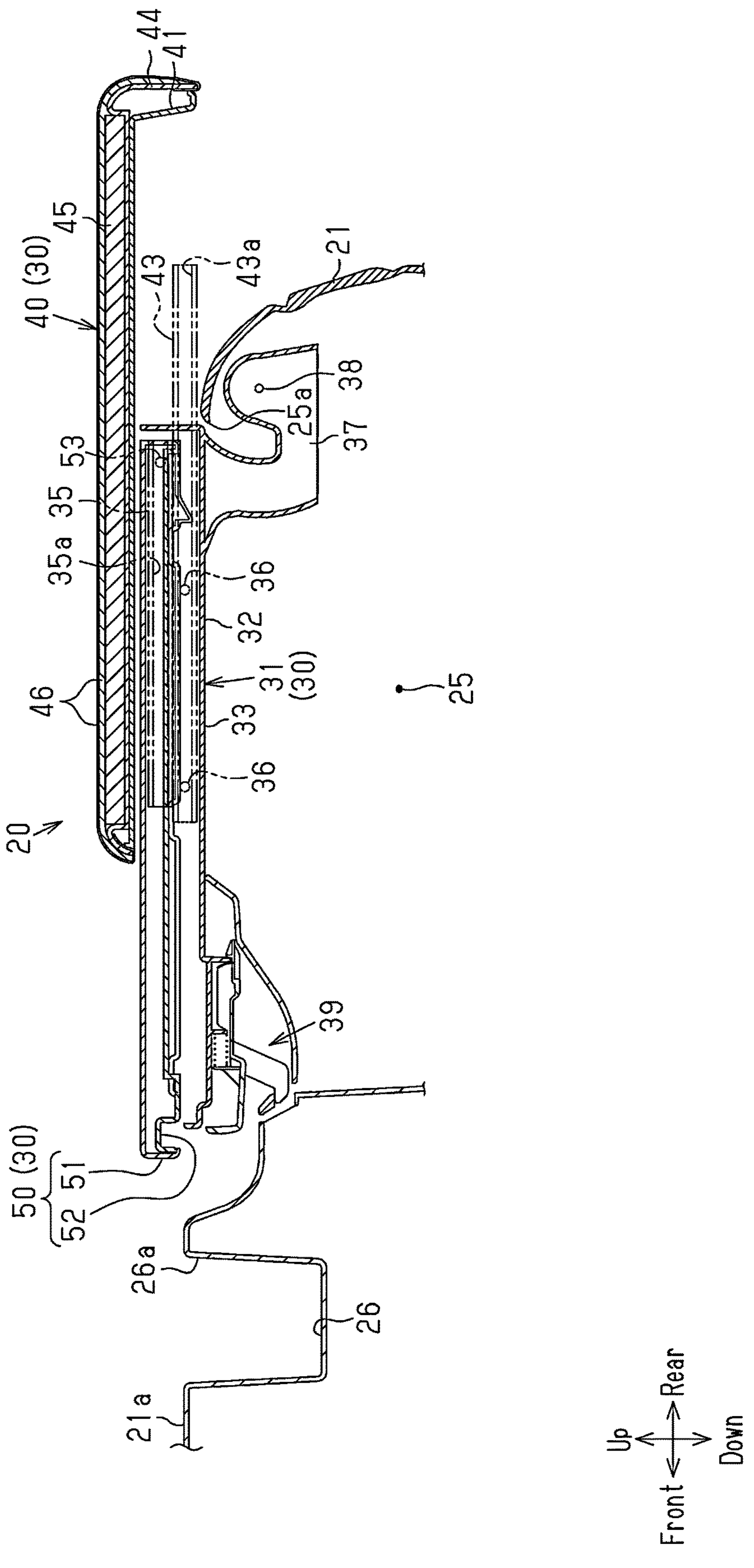
FIG. 5 is a cross-sectional view taken along line 5-5 of FIG. 4.

With such a structure, as shown in FIGS. 4 and 5, the table 50 is exposed from the armrest 40 by sliding the armrest 40 from the first position to the second position independently of the table 50. Thus, even when there is an item or the like in front of the armrest 40 at the first position, the table 50 can be easily switched from the accommodation state, in which the table 50 is accommodated in the armrest 40, to the usage state, in which the table 50 is exposed from the armrest 40. This improves the convenience of the table 50.

(3) The console body 21 includes the recess 25 having the opening 25*a* in the upper surface 21*a* of the console body 21 so that items can be placed in and taken out through the opening 25*a*. The lid 30 is arranged to be pivotable between the closed position at which the lid 30 closes the opening 25*a* and the open position at which the lid 30 opens the opening 25*a*.

With such a structure, when the lid 30 is at the open position, items can be placed in and taken out through the opening 25*a* of the recess 25. Further, when the lid 30 is at the closed position, the items are accommodated and held in the recess 25. This enables the console body 21 to have the functionality for accommodating items.

(4) The lid 30 is configured to be pivotable between the closed position and the open position regardless of any position of the armrest 40 between the first position and the second position.

With such a structure, as shown in FIGS. 6 and 7, the lid 30 can be pivoted between the closed position and the open position regardless of the position of the armrest 40. This improves the convenience of the vehicle console 20 compared to, for example, a case in which the lid 30 can be pivoted between the closed position and the open position only when the armrest 40 is at a predetermined position between the first position and the second position.

(5) The lid 30 includes the hinge member 31. The hinge member 31 is supported by the console body 21 to be pivotable about the axis 38 extending in the right-left direction. The hinge member 31 pivots about the axis 38 to allow the lid 30 to pivot between the closed position and the open position. The armrest 40 is supported by the hinge member 31 to be slidable in the front-rear direction.

With such a structure, the pivoting of the lid 30 between the closed position and the open position is performed by the hinge member 31 supported by the console body 21 to be pivotable about the axis 38 extending in the right-left direction. Further, with the above structure, the hinge member 31 supports the armrest 40 to be slidable in the front-rear direction. This reduces the number of parts of the lid 30 compared to a case in which a member that slidably supports the armrest 40 is additionally arranged on the lid 30.

(6) The table 50 is supported by the hinge member 31.

With such a structure, the armrest 40 and the table 50 are supported by the hinge member 31. This further reduces the number of parts of the lid 30 as compared to a case in which members that support the armrest 40 and the table 50 are additionally arranged on the lid 30.

(7) The recess 26 having the opening 26*a* is arranged in the upper surface 21*a* at the position adjacent to the front of the recess 25.

With such a structure, small items can be placed in the recess 26 through the opening 26*a*. In other words, the recess 26 can be used, for example, as a console compartment.

Modifications

The above-described first embodiment may be modified as follows. The first embodiment and the following modifications can be combined as long as the combined modifications remain technically consistent with each other.

The table 50 may be configured to be slidable between the accommodation position shown in FIG. 1 and the usage position (refer to FIG. 8), located frontward from the accommodation position in the front-rear direction, by changing the position of the projections 53 relative to the inner lateral guide grooves 35*a*.

Figure 8:
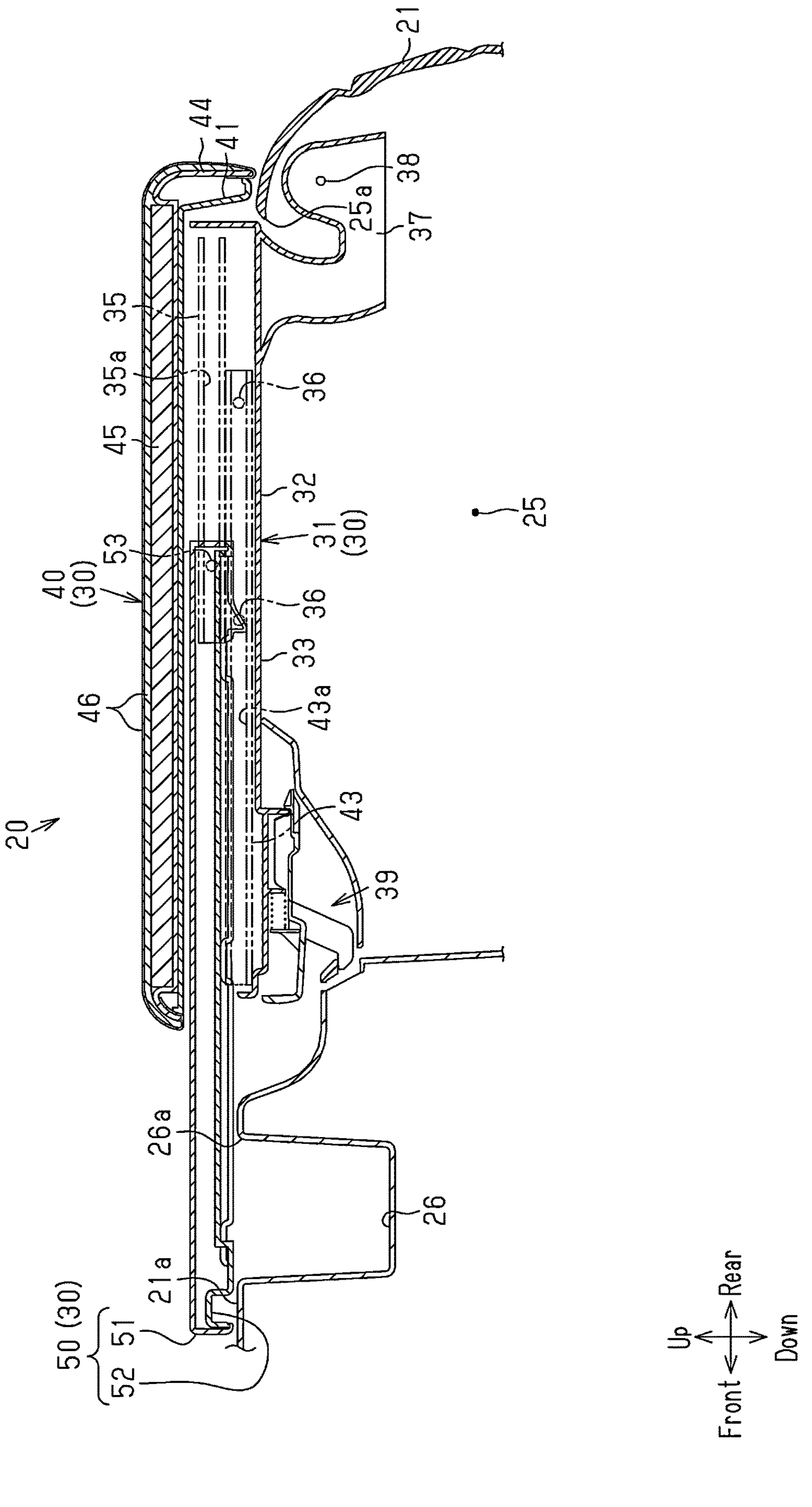
FIG. 8 is a cross-sectional view showing a state in which the table is pulled forward from the state shown in FIG. 3.

With such a structure, as shown in FIG. 8, the front portion of the table 50 is exposed from the armrest 40 at the first position by holding the front end of the table 50 at the accommodation position and pulling the table 50 forward. Thus, the upper surface of the front portion of the table 50 can be used as a table surface. Further, with the above structure, when the table 50 is pulled to an extension position, the opening 26*a* of the recess 26 is closed by the front portion of the table 50. This enables the recess 26 to have the functionality for accommodating small items.

The table 50 may be fixed to the hinge member 31.

The table 50 does not need to be supported by the hinge member 31. A member that supports the table 50 may be additionally arranged on the lid 30.

The armrest 40 does not need to be supported by the hinge member 31 to be slidable in the front-rear direction. A member that supports the armrest 40 may be additionally arranged on the lid 30. Even in this case, the armrest 40 may be configured to be slidable between the first position and the second position independently of the table 50.

The lid 30 may be configured to be pivotable from the closed position to the open position only when the armrest 40 is at a predetermined position between the first position and the second position.

The console body 21 does not need to include the recess 25. In this case, the lid 30 does not need to be pivotable between the closed position and the open position with the hinge member 31 as described in the present embodiment. For example, the lid 30 may be attached to the console body 21 in a non-pivotable manner without the hinge member 31. Even in this case, the armrest 40 may be configured to be slidable between the first position and the second position in the front-rear direction.

The console body 21 does not need to include the recess 26.

Second Embodiment

The vehicle console according to a second embodiment will now be described with reference to the drawings. A console 114 of the present embodiment is the console of an automobile 110. In the following description, the direction in which the automobile 110 advances forward will be referred to as the front, and the reverse direction will be referred to as the rear. The vertical direction refers to the vertical direction of the automobile 110, and the right-left direction refers to the vehicle width direction that agrees with the right-left direction when the automobile 110 is advancing forward.

Figure 9:
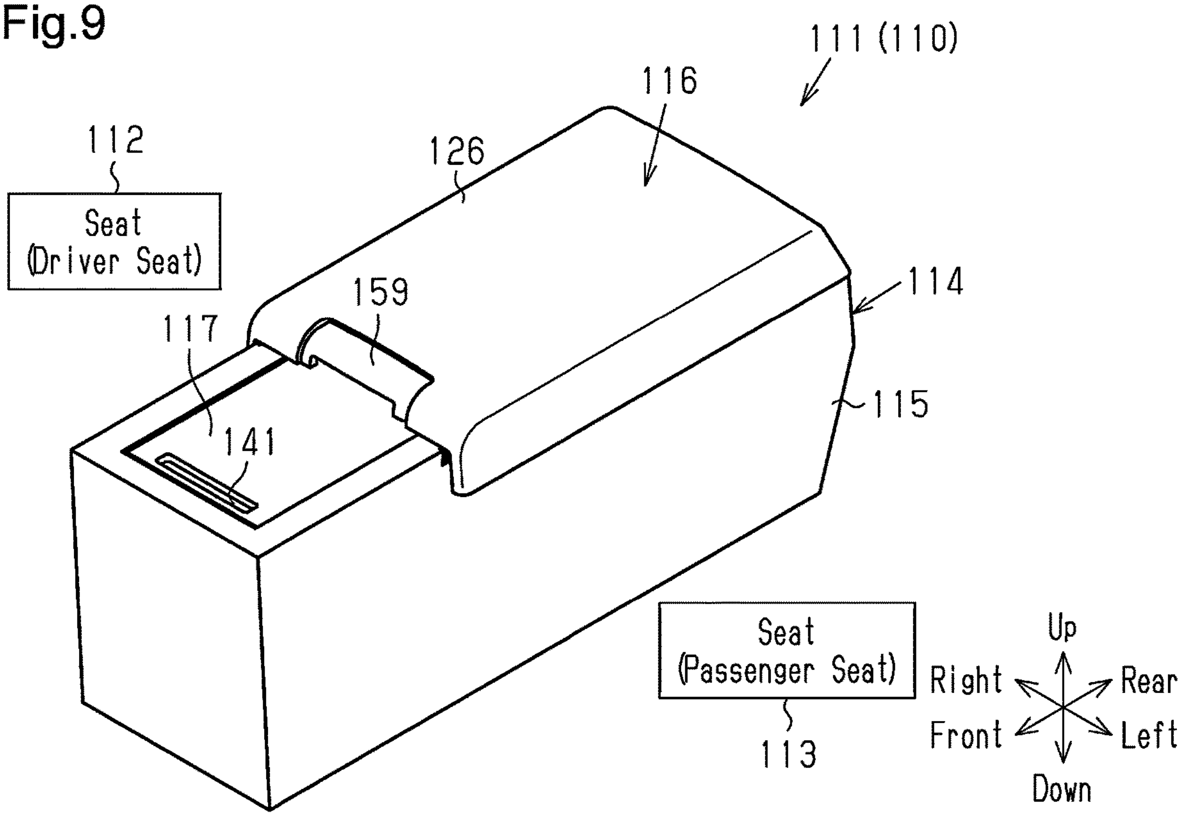
FIG. 9 is a perspective view of a console according to the second embodiment when the table is at a usage position and the lid is at a closing position.

As shown in FIG. 9, two seats 112 and 113 are arranged as front seats adjacent to and spaced apart from each other in the right-left direction inside a passenger compartment 111 of the automobile 110. In one example, the seat 112 on the right serves as a driver seat in which a driver is seated. In one example, the seat 113 on the left serves as a passenger seat in which a passenger is seated. The console 114 extending in the front-rear direction is arranged between the two seats 112 and 113, i.e., the driver seat and the passenger seat.

In the description of each portion of the console 114, the central portion in the right-left direction is used as a reference. In the right-left direction, the direction toward the central portion may be referred to as "inside," "inward," "inner side," or the like, and the direction away from the central portion may be referred to as "outside," "outward," "outer side," or the like.

Console 114

As shown in FIG. 9, the console 114 includes a box body 115, a lid 116, and a table 117.

Box Body 115

Figure 11:
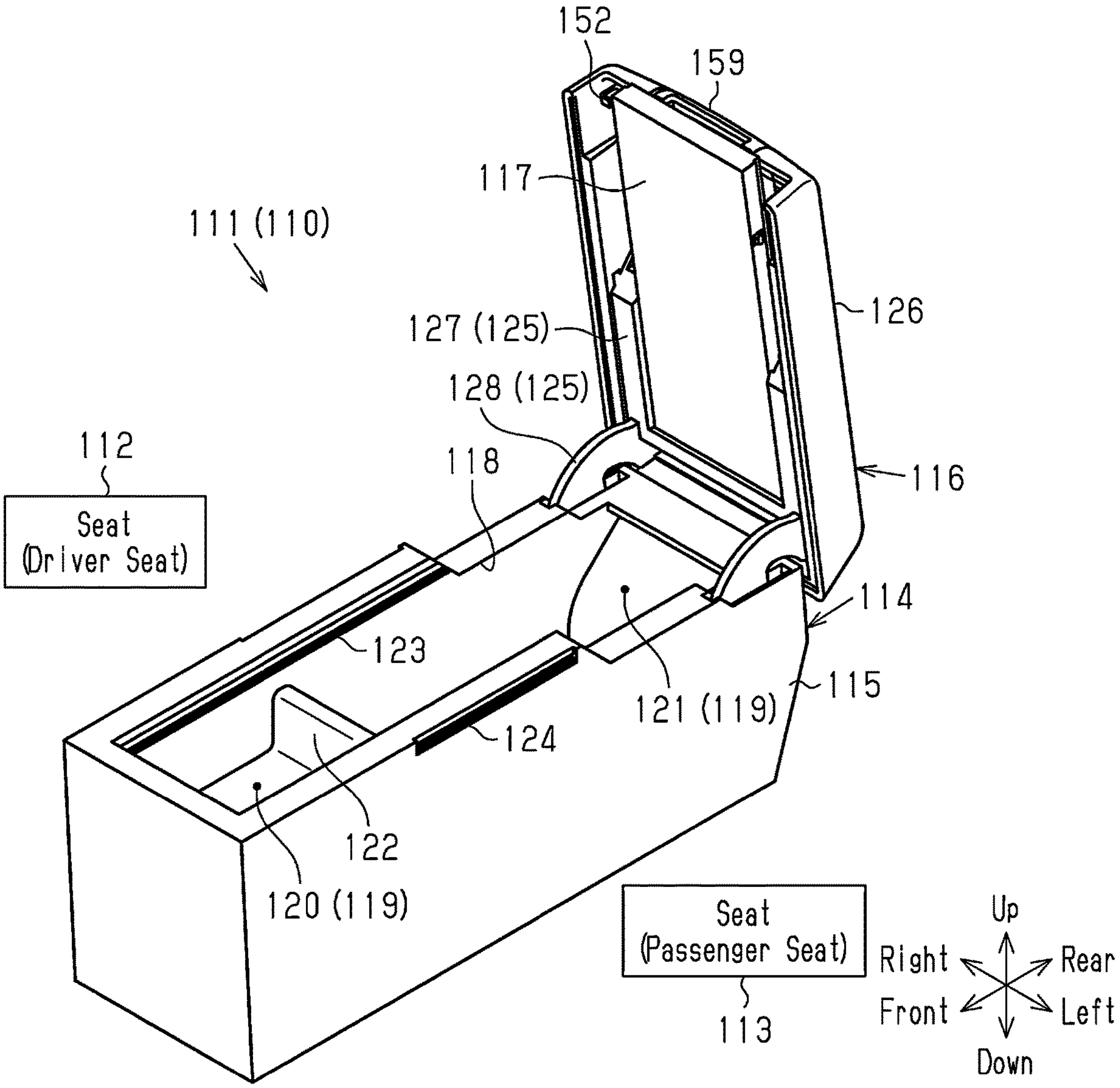
FIG. 11 is a perspective view showing a state in which the lid is pivoted to an opening position in FIG. 10.

As shown in FIG. 11, the box body 115 includes an upper opening 118 and has a rectangular box shape with a closed end extending in the front-rear direction. The box body 115 includes an inner accommodation portion 119. The box body 115 is configured so that items can be placed in and taken out of the accommodation portion 119 through the upper opening 118. The accommodation portion 119 includes a first accommodation portion 120 arranged in the front portion of the box body 115 and a second accommodation portion 121 arranged from the central portion to the rear portion of the box body 115 in the front-rear direction.

The first accommodation portion 120 and the second accommodation portion 121 are separated by a partition member 122. The depth of the first accommodation portion 120 is less than the depth of the second accommodation portion 121. Two second grooves 123 each extending straight in the front-rear direction are arranged from the front portion to the central portion of the box body 115 at the upper ends of two inner surfaces on the right and left. The two second grooves 123 are opposed to each other in the right-left direction. Two third grooves 124 each extending straight in the front-rear direction are arranged in the central portion of the box body 115 at the upper ends of two outer surfaces on the right and left.

Lid 116

Figure 12:
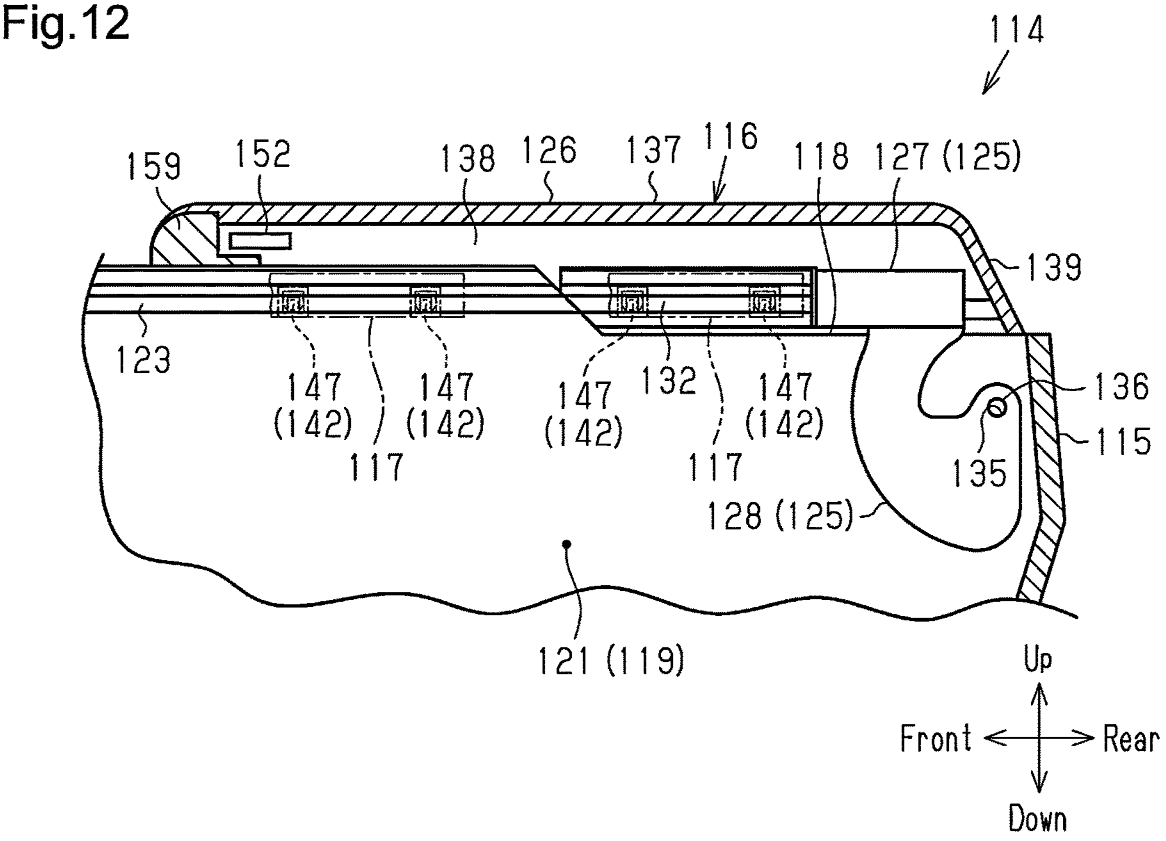
FIG. 12 is a partial cross-sectional view when
Figure 13:
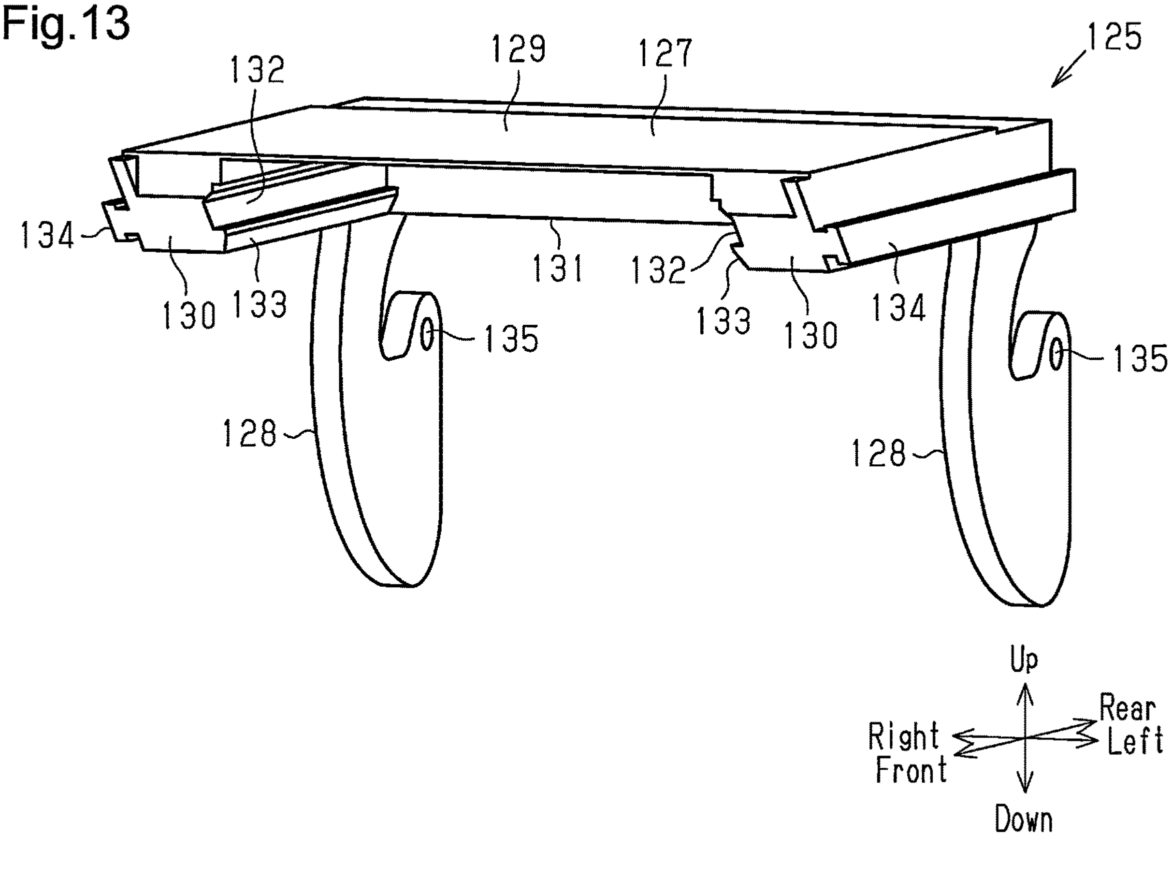
FIG. 13 is a perspective view of a hinge member of the console of FIG. 9.
Figure 14:
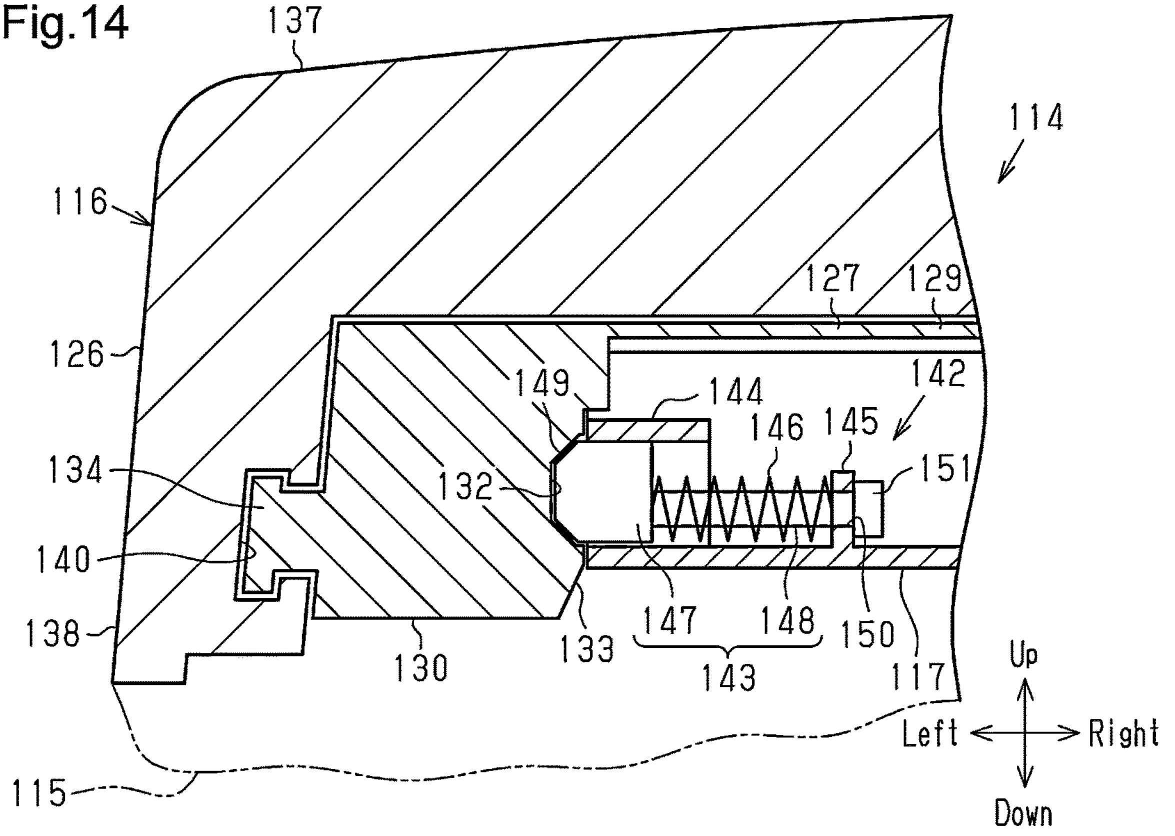
FIG. 14 is a partial cross-sectional view when

As shown in FIGS. 12 to 14, the lid 116 includes a hinge member 125 pivotably attached to the box body 115, and a lid body 126 attached to the hinge member 125 in a slidable manner in the front-rear direction. The hinge member 125 includes a base portion 127 arranged at the upper side of the rear portion of the box body 115, and two hinge portions 128 arranged at the right and left ends in the rear end of the base portion 127.

The base portion 127 includes a quadrangular and plate-shaped base upper wall 129, two base side walls 130 respectively arranged at the opposite ends on the right and left on the lower surface of the base upper wall 129, and a base rear wall 131 arranged at the rear end of the lower surface of the base upper wall 129 and connecting rear ends of the two base side walls 130 to each other. Two first grooves 132 each extending straight in the front-rear direction are arranged in the inner surfaces of the two base side walls 130. The two first grooves 132 are opposed to each other in the right-left direction.

Guide slopes 133 having a height that decreases outward are arranged adjacent to the first grooves 132 at the lower side of the first grooves 132 on the two base side walls 130. Two engagement projections 134 each extending straight in the front-rear direction are arranged on the outer surfaces of the two base side walls 130. The engagement projections 134 are substantially T-shaped in cross-sectional view.

The two hinge portions 128 are respectively connected to the rear ends on the lower surfaces of the two base side walls 130. The two hinge portions 128 are substantially U-shaped and flat. A shaft hole 135 extends through the distal end of each of the two hinge portions 128. A shaft 136 extending in the right-left direction is inserted through the shaft holes 135 of the two hinge portions 128. In other words, the two hinge portions 128 are pivotably supported by the shaft 136 through the shaft holes 135. The shaft 136 is supported at the rear end of the box body 115.

The lid body 126 includes a rectangular and plate-shaped lid upper wall 137 extending in the front-rear direction, two lid side walls 138 each projecting downward from the opposite ends on the right and left of the lid upper wall 137, and a lid rear wall 139 projecting downward from the rear end of the lid upper wall 137 and connecting the rear ends of the two lid side walls 138 to each other. The lid body 126 covers the base portion 127 of the hinge member 125 from above.

Two engagement recesses 140 each extending straight in the front-rear direction are arranged in the inner surfaces of the two lid side walls 138. The engagement recesses 140 are substantially T-shaped in cross-sectional view. In other words, the cross-sectional shape of the engagement recess 140 corresponds to the cross-sectional shape of the engagement projection 134. The engagement projections 134 of the two base side walls 130 are slidably inserted into the engagement recesses 140 of the two lid side walls 138.

Thus, the lid body 126 is attached to the hinge member 125 in a slidable manner in the front-rear direction while being restricted from moving in the vertical direction and the right-left direction. The lid body 126 pivots about the shaft 136 together with the hinge member 125. Specifically, the lid 116 pivots about the shaft 136 between a closing position (shown in FIG. 10) at which the lid 116 closes the upper opening 118 and an opening position (shown in FIG. 11) at which the lid 116 opens the upper opening 118. That is, the lid 116 opens and closes the upper opening 118 of the box body 115.

When the lid 116 is at the closing position, the two first grooves 132 of the lid 116 and the two second grooves 123 of the box body 115 are adjacent to one another on the same straight line. In other words, when the lid 116 is at the closing position, the front ends of the two first grooves 132 are continuous with the rear ends of the two second grooves 123. The lid 116 at the closing position also serves as an armrest for the driver seated on the seat 112 or the passenger seated on the seat 113.

Table 117

Figure 15:
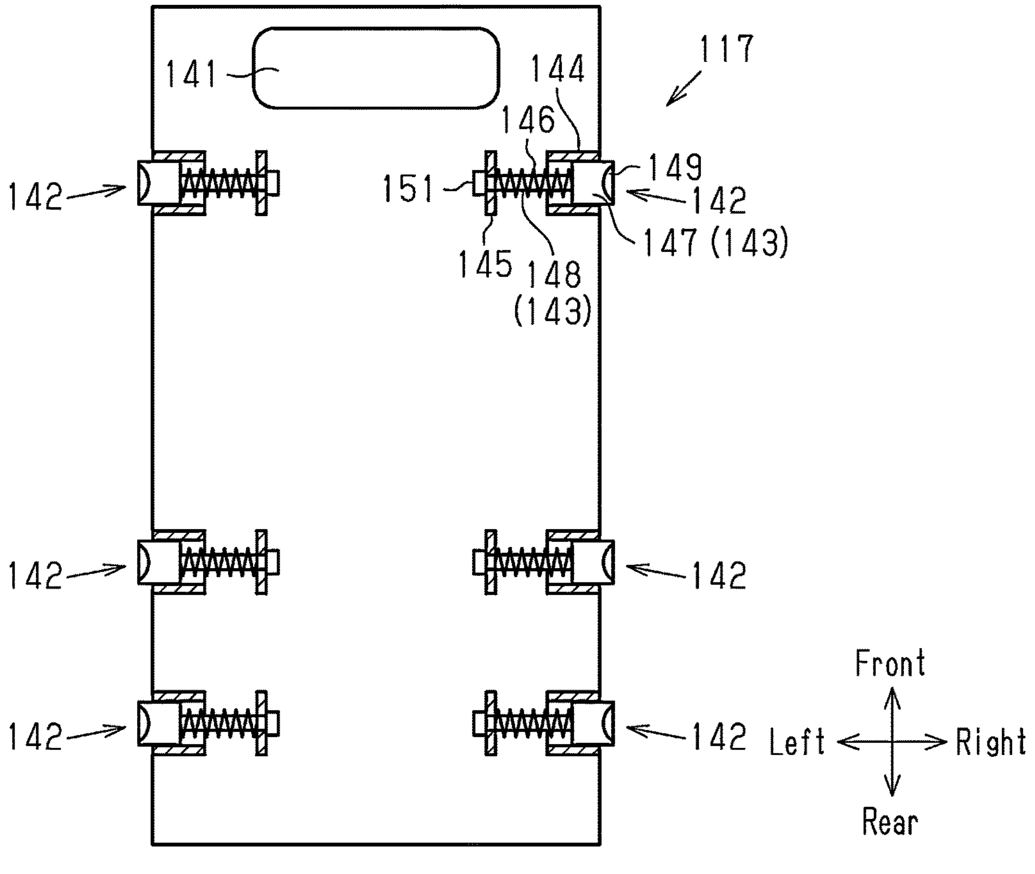
FIG. 15 is a schematic cross-sectional plan view of the table of the console of FIG. 9.

As shown in FIGS. 14 and 15, the table 117 is rectangular and plate-shaped extending in the front-rear direction. A substantially rectangular finger grip recess 141 configured to accommodate a finger when sliding the table 117 is arranged in the central portion at the front end of the upper surface of the table 117 in the right-left direction. The table 117 includes three pairs of right and left sliding mechanisms 142. Specifically, in the table 117, a pair of right and left sliding mechanisms 142 are arranged in the front portion, and two pairs of right and left sliding mechanisms 142 are arranged adjacent to each other in the rear portion along the front-rear direction. The sliding mechanisms 142 of each pair are arranged at the right and left ends of the table 117.

Each sliding mechanism 142 includes a sliding member 143 extending in the right-left direction, a guide member 144, a support member 145, and a coil spring 146. The sliding member 143 includes a block-shaped sliding portion 147 partly projecting outward from the table 117, and a shaft portion 148 extending inward from the inner surface of the sliding portion 147. The outer diameter of the shaft portion 148 is less than the outer diameter of the sliding portion 147. The shaft portion 148 is inserted into the coil spring 146. Sliding slopes 149 having a height that decreases outward are arranged at the upper ends of the sliding portions 147 at the outer ends in the right-left direction.

The guide member 144 is tubular and fixed to the table 117 so that the sliding portion 147 is slidably inserted into the guide member 144. The guide member 144 allows movement of the sliding portion 147 in the right-left direction and restricts movement of the sliding portion 147 in the front-rear direction and the vertical direction. The inner end of the shaft portion 148 in the right-left direction is slidably inserted through a through-hole 150 extending through a plate-shaped support member 145 fixed to the table 117.

The distal end of the shaft portion 148 located inward from the support member 145 in the right-left direction includes an increased diameter portion 151 having a greater outer diameter than the other portions of the shaft portion 148. The outer diameter of the increased diameter portion 151 is greater than the diameter of the through-hole 150. Thus, the support member 145 supports the shaft portion 148 to restrict an outward movement of the shaft portion 148 in the right-left direction and allows an inward movement of the shaft portion 148 in the right-left direction. The coil spring 146 is arranged between the support member 145 and the sliding portion 147 to constantly bias the sliding portion 147 outward in the right-left direction.

Figure 10:
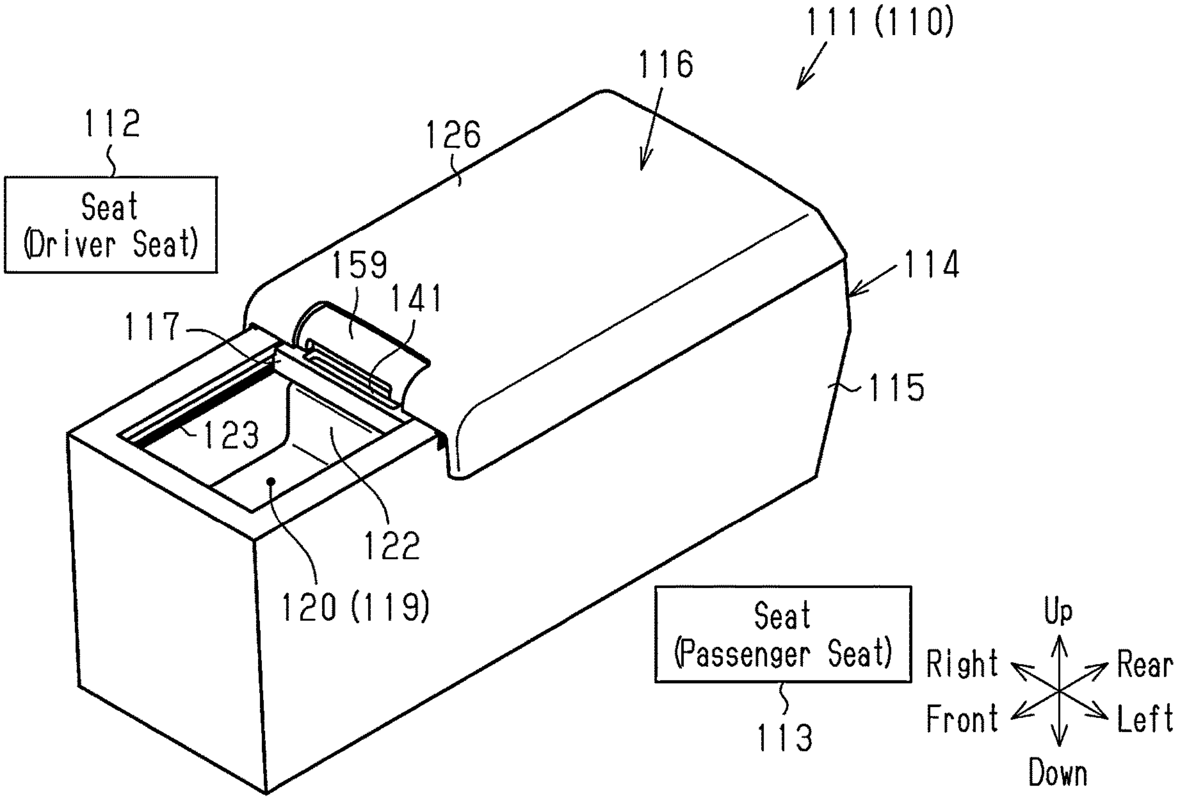
FIG. 10 is a perspective view showing a state in which the table is slid to an accommodation position in FIG. 9.

As shown in FIGS. 9, 10, and 12, the table 117 is slidably supported by the two second grooves 123 of the box body 115 at the sliding portions 147 of the pairs of the sliding mechanisms 142. The table 117 in this case is at the usage position (indicated by long-dash short-dash line in FIG. 12 and indicated by solid line in FIG. 9). That is, the box body 115 slidably supports the table 117 at the usage position in the two second grooves 123. The table 117 at the usage position closes the first accommodation portion 120 of the box body 115.

When the lid 116 is at the closing position, the table 117 is slid (moved) rearward to be accommodated in the lid 116. The table 117 in this case is at the accommodation position (indicated by long-dash double-short-dash line in FIG. 12 and indicated by solid line in FIG. 10). The table 117 at the accommodation position opens the first accommodation portion 120 of the box body 115.

The table 117 at the accommodation position is slidably supported by the two second grooves 123 of the box body 115 at the sliding portions 147 of the pair of the sliding mechanisms 142 in the front portion, and is also slidably supported by the two first grooves 132 of the lid 116 at the sliding portions 147 of the two pairs of the sliding mechanisms 142 in the rear portion. That is, the lid 116 slidably supports the table 117 at the accommodation position in the two first grooves 132.

Thus, the table 117 is configured to be slidable (movable), when the lid 116 is at the closing position, between the accommodation position at which the table 117 is accommodated and supported by the lid 116 and the usage position at which the table 117 is pulled out from the lid 116 and supported by the box body 115.

The two first grooves 132 and the two second grooves 123 are configured so that, when the table 117 is at the accommodation position and the lid 116 is pivoted from the closing position to the opening position, the sliding portions 147 of the pair of the sliding mechanisms 142 in the front portion of the table 117 are disengaged from the two second grooves 123, and the sliding portions 147 of the two pairs of sliding mechanisms 142 in the rear portion of the table 117 are not disengaged from the two first grooves 132.

Thus, when the table 117 is at the accommodation position and the lid 116 is pivoted from the closing position to the opening position, as shown in FIG. 11, the table 117 is lifted by the lid 116 and the table 117 is separated from the box body 115.

Lock Mechanism 152

Figure 16:
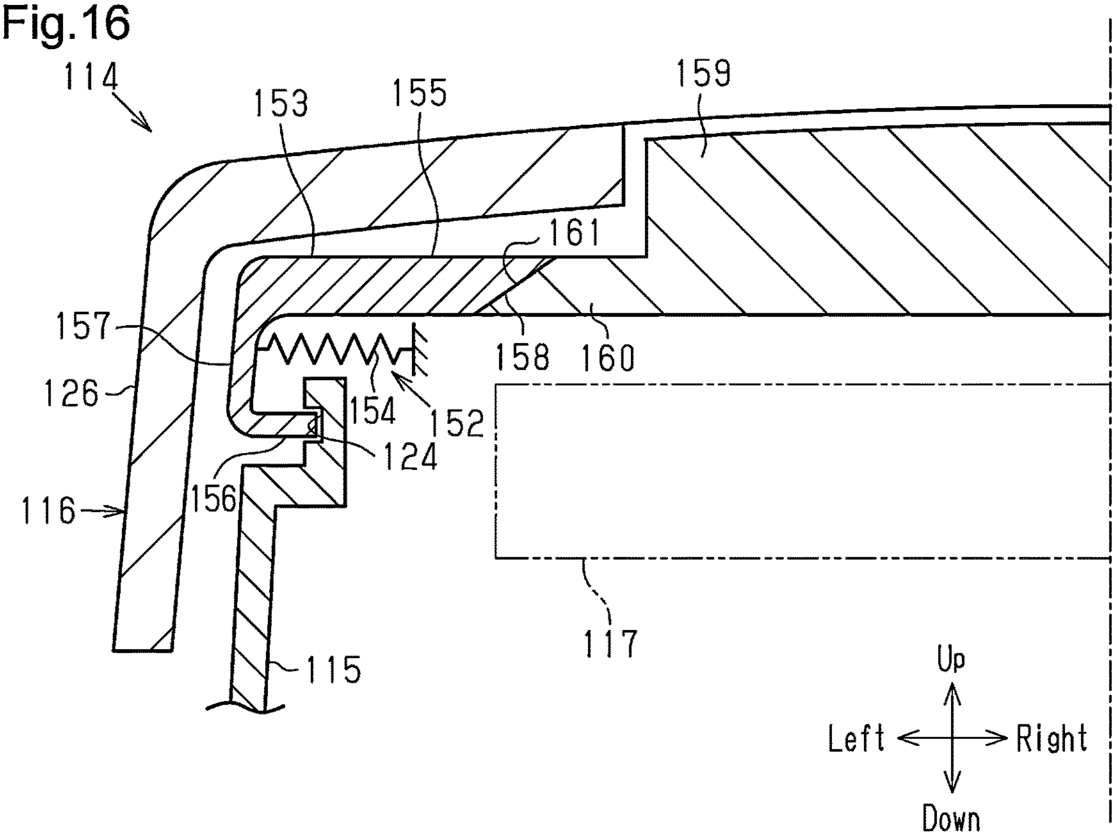
FIG. 16 is an enlarged schematic cross-sectional view showing the positional relationship between a lock mechanism and an operation portion when pivoting of the lid of the console of FIG. 9 is restricted.

As shown in FIGS. 12 and 16, two lock mechanisms 152 that restrict pivoting of the lid 116 at the closing position are arranged at the right and left ends at the front end of the lid body 126. The two lock mechanisms 152 are arranged outward from the table 117 at the accommodation position in the right-left direction (vehicle width direction).

As shown in FIGS. 11 and 16, each lock mechanism 152 includes a movable member 153 and a spring 154 that constantly biases the movable member 153 inward in the right-left direction. The movable member 153 includes a first engagement portion 155 extending in the right-left direction, a second engagement portion 156 arranged below the first engagement portion 155 and extending in the right-left direction, and a connection portion 157 extending in the vertical direction and connecting the outer ends of the first engagement portion 155 and the second engagement portion 156 in the right-left direction.

The second engagement portion 156 is shorter than the first engagement portion 155 in the right-left direction. The inner end of the second engagement portion 156 in the right-left direction is slidably inserted into the third groove 124 of the box body 115 from the outer side in the right-left direction. The state in which the inner end of the second engagement portion 156 in the right-left direction is inserted into the third groove 124 is maintained by the biasing force of the spring 154. In this state, movement of the second engagement portion 156 in the front-rear direction is allowed, and movement of the second engagement portion 156 in the vertical direction is restricted.

That is, the state in which the inner end of the second engagement portion 156 in the right-left direction is inserted into the third groove 124 is a locked state in which pivoting of the lid 116 at the closing position is restricted. In this locked state, the inner end of the second engagement portion 156 in the right-left direction is slidable in the front-rear direction by the length of the third groove 124. Thus, the lid body 126 is allowed to slide in the front-rear direction relative to the hinge member 125 by the length of the third groove 124. The lower surface of the inner end of the first engagement portion 155 in the right-left direction includes a first inclined surface 158 inclined to increase in height inward in the right-left direction.

Operation Portion 159

As shown in FIG. 16, an operation portion 159 that is operated to cancel a state in which pivoting of the lid 116 is restricted by the lock mechanism 152 is arranged in the central portion at the front end of the lid body 126 in the right-left direction. The operation portion 159 is arranged above the table 117 at the usage position. The operation portion 159 is operated to move upward by a predetermined amount when canceling the locked state in which pivoting of the lid 116 is restricted by the lock mechanism 152. The operation portion 159 includes two arms 160 extending outward in the right-left direction at the opposite sides on the right and left.

The upper surfaces of the outer ends of the two arms 160 in the right-left direction include second inclined surfaces 161 inclined to decrease in height outward in the right-left direction. The inclination angle of each second inclined surface 161 is the same as the inclination angle of the corresponding first inclined surface 158. The second inclined surfaces 161 of the two right and left arms 160 are in slidable contact with the first inclined surfaces 158 of the two right and left movable members 153.

Figure 17:
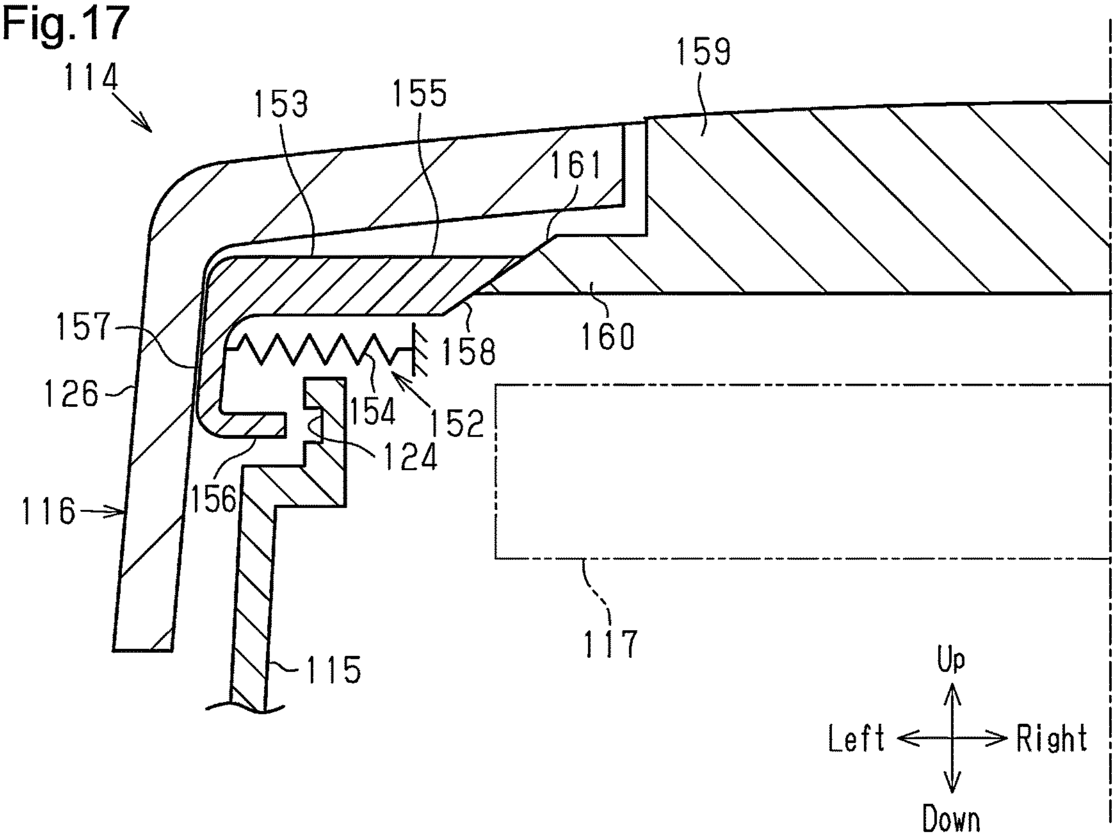
FIG. 17 is an enlarged schematic cross-sectional view showing the positional relationship between the lock mechanism and the operation portion when canceling a state in which pivoting of the lid of the console is restricted in FIG. 9.

As shown in FIG. 17, when the operation portion 159 is pulled upward, the second inclined surface 161 of the arm 160 slides upward on the first inclined surface 158 of the movable member 153. In accordance with this sliding, the movable member 153 is pushed outward in the right-left direction by the arm 160, and the movable member 153 moves outward in the right-left direction against the biasing force of the spring 154. Thus, the inner end of the second engagement portion 156 of the movable member 153 in the right-left direction is separated from the third groove 124, and the state in which pivoting of the lid 116 at the closing position is restricted by the lock mechanism 152 is canceled.

When the upward pulling of the operation portion 159 is stopped, the movable member 153 moves inward in the right-left direction by the biasing force of the spring 154. Thus, the inner end of the second engagement portion 156 of the movable member 153 in the right-left direction is inserted into the third groove 124 again, and pivoting of the lid 116 at the closing position is restricted by the lock mechanism 152.

In this case, as the biasing force of the spring 154 moves the movable member 153 inward in the right-left direction, the first inclined surface 158 of the movable member 153 slides upward on the second inclined surface 161 of the arm 160. Thus, the operation portion 159 pulled upward lowers to the original position.

Operation of Present Embodiment

As shown in FIG. 9, in the console 114, when the lid 116 is at the closing position and the table 117 is at in the usage position, part of the table 117 is exposed from the lid 116. Thus, for example, a drink, food, or the like can be placed on a portion of the table 117 exposed from the lid 116. When the area of the table 117 is insufficient, the lid body 126 can be slid rearward to expose a significant portion of the table

Figure 18:
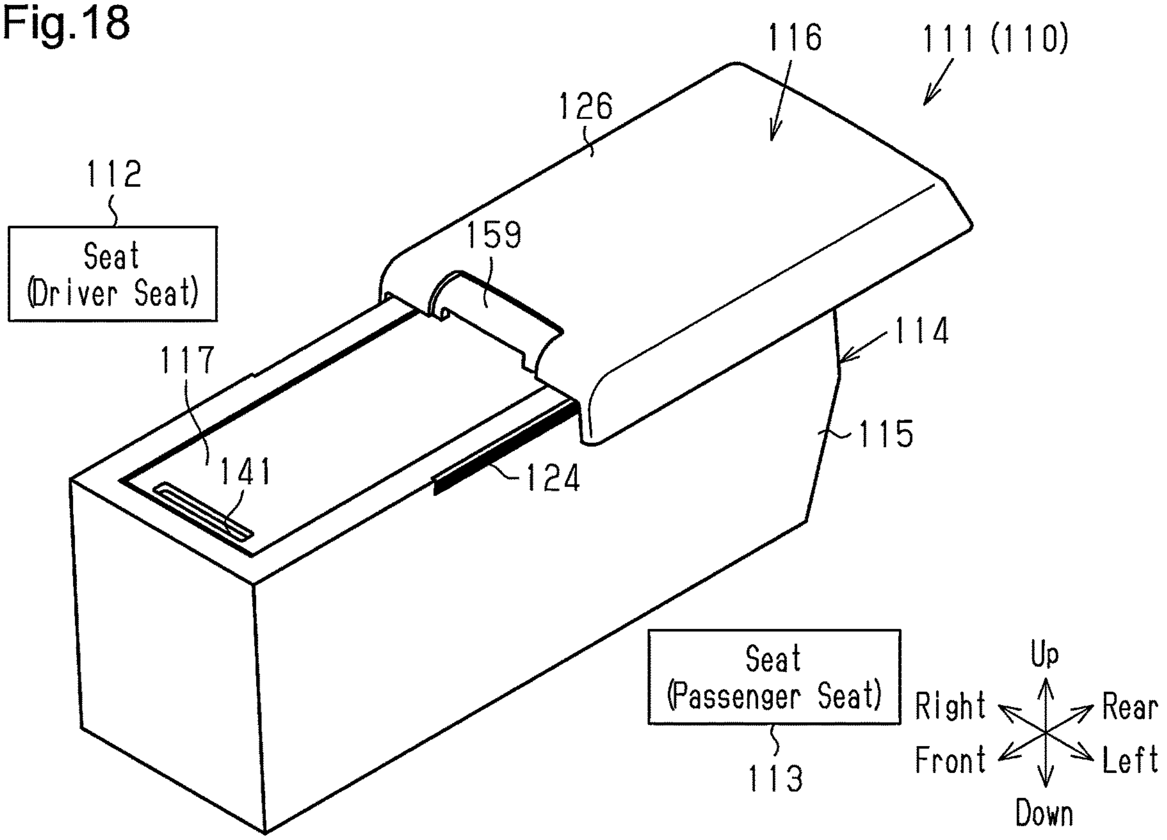
FIG. 18 is a perspective view showing a state in which a lid body is slid rearward in FIG. 9.

117 from the lid 116 as shown in FIG. 18. This will resolve the lack of the area of the table 117.

When the table 117 is slid from the state shown in FIG. 9 to the accommodation position, the table 117 is supported by the lid 116 and the first accommodation portion 120 of the box body 115 is exposed as shown in FIG. 10. This allows access to the first accommodation portion 120 from the upper opening 118 of the box body 115.

Further, when the lid 116 is pivoted from the state shown in FIG. 10 to the opening position, the lid 116 is changed to the opening position while supporting the table 117 as shown in FIG. 11. Thus, the second accommodation portion 121 of the box body 115 is exposed in addition to the first accommodation portion 120. This allows access to the second accommodation portion 121 in addition to the first accommodation portion 120 from the upper opening 118 of the box body 115.

Figure 19:
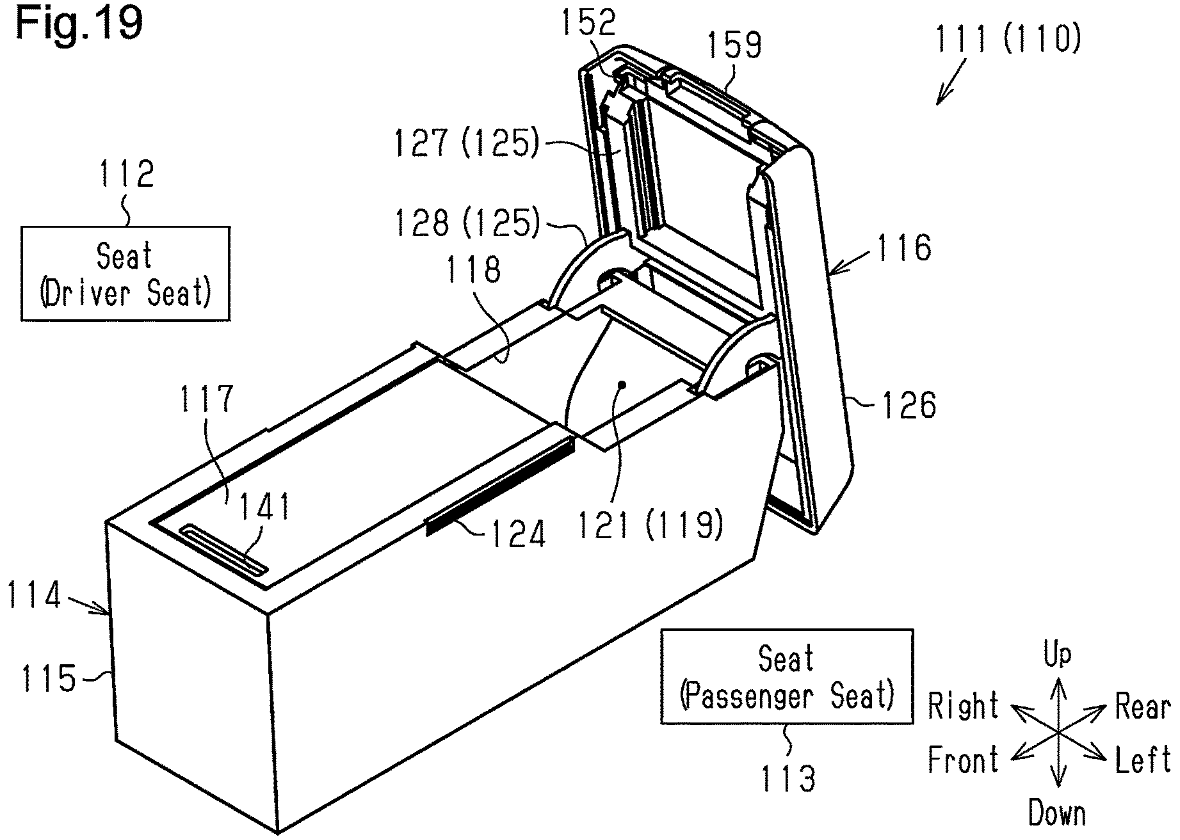
FIG. 19 is a perspective view showing a state in which the lid is pivoted to the opening position in FIG. 18.

Further, when the lid 116 is pivoted from the state shown in FIG. 18 to the opening position, the table 117 is at the usage position at which the table 117 is supported by the box body 115, and the lid 116 is changed to the opening position while leaving the table 117 at the usage position as shown in FIG. 19. Thus, part of the second accommodation portion 121 of the box body 115 is exposed to allow access to the second accommodation portion 121 from the upper opening 118 of the box body 115.

Figure 20:
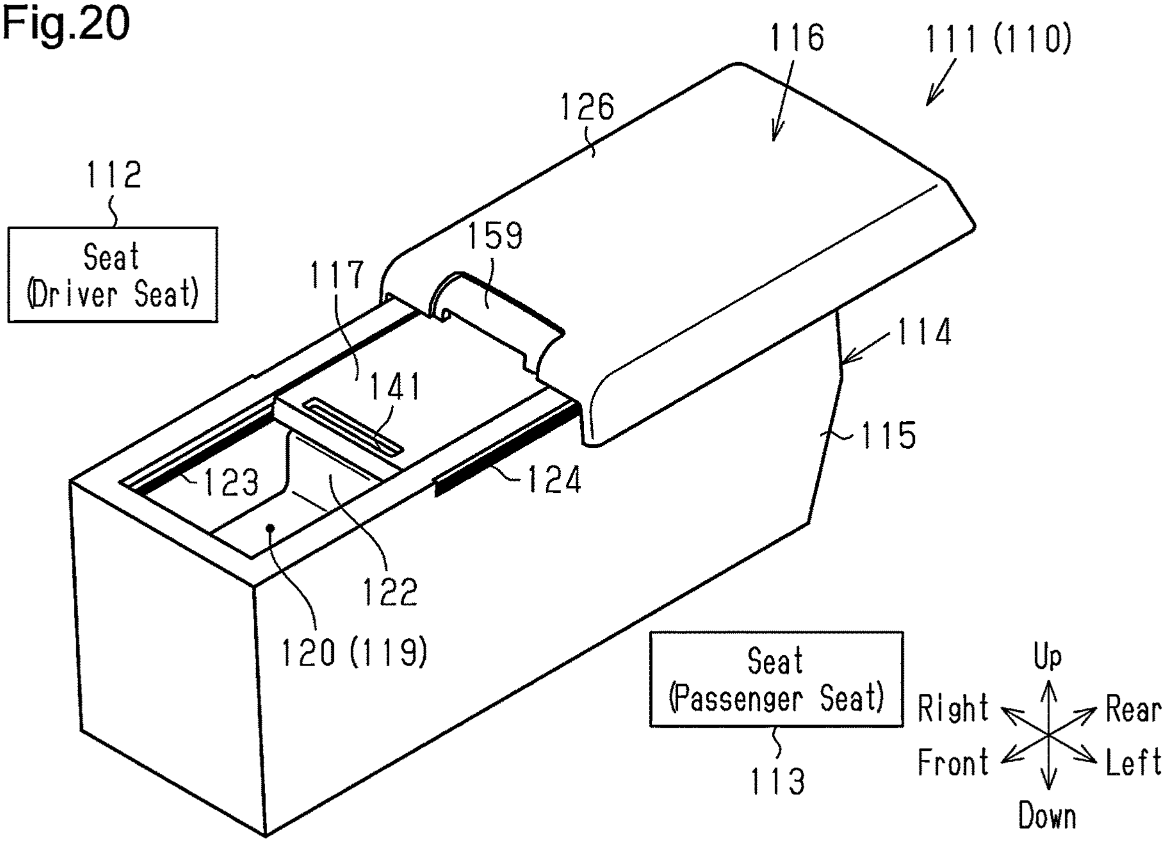
FIG. 20 is a perspective view showing a state in which the lid body is slid rearward in FIG. 10.

When the table 117 is slid from the state shown in FIG. 18 to the accommodation position, the table 117 is supported by the lid 116 and the first accommodation portion 120 of the box body 115 is exposed as shown in FIG. 20. This allows access to the first accommodation portion 120 from the upper opening 118 of the box body 115.

Figure 21:
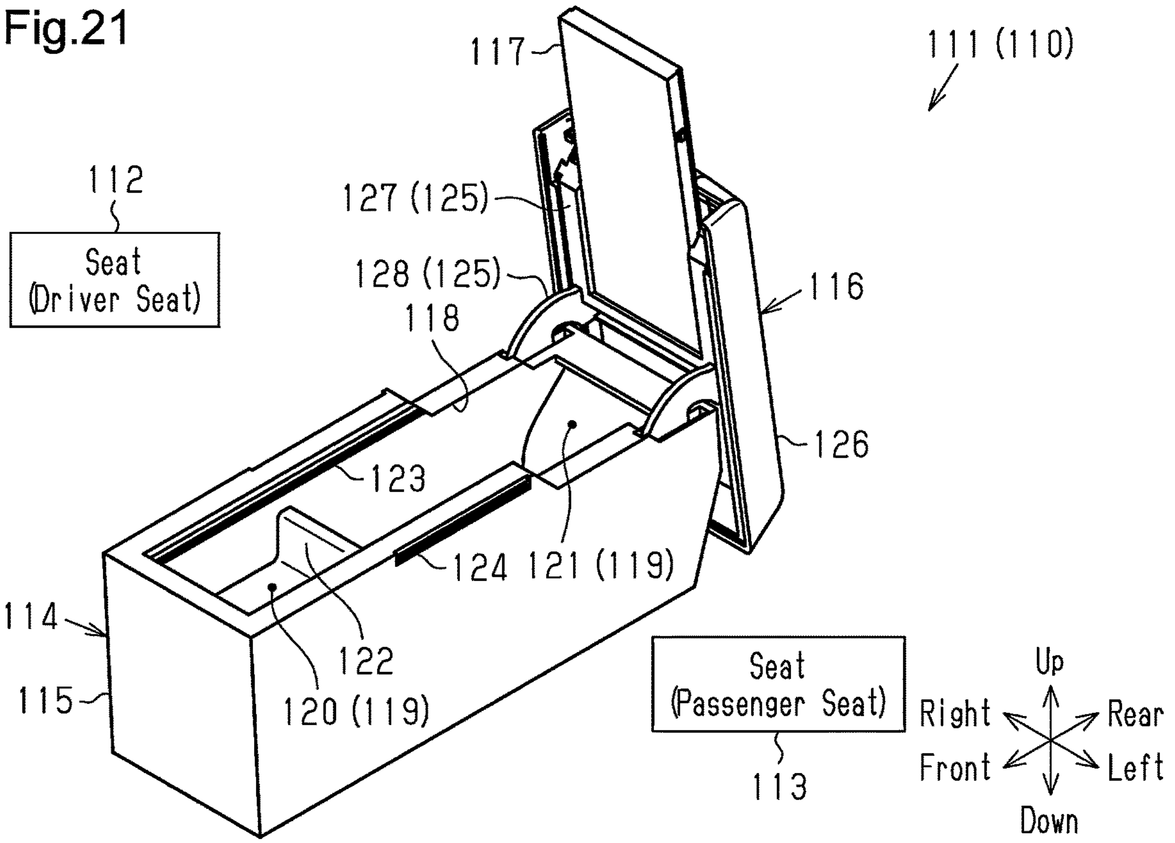
FIG. 21 is a perspective view showing a state in which the lid is pivoted to the opening position in FIG. 20.

Further, when the lid 116 is pivoted from the state shown in FIG. 20 to the opening position, the lid 116 is changed to the opening position while supporting the table 117 as shown in FIG. 21. Thus, the second accommodation portion 121 of the box body 115 is exposed in addition to the first accommodation portion 120. This allows access to the second accommodation portion 121 in addition to the first accommodation portion 120 from the upper opening 118 of the box body 115.

When the table 117 is slid from the state shown in FIG. 19 to the accommodation position, the sliding portions 147 of the two pairs of sliding mechanisms 142 in the rear portion of the table 117 are disengaged from the two second grooves 123 of the box body 115. In this state, the lid 116 is pivoted to the closing position. In this case, as shown in FIG. 14, the guide slope 133 of the base portion 127 of the lid 116 abuts the sliding slope 149 of the sliding portion 147 of the sliding member 143 of the table 117 from above.

When the guide slope 133 of the base portion 127 further slides downward on the sliding slopes 149 of the sliding portions 147, the guide slope 133 pushes and moves the sliding portion 147 inward in the right-left direction against the biasing force of the coil spring 146. When the guide slope 133 of the base portion 127 further moves downward, the sliding portion 147 is guided to the first groove 132 by the guide slope 133.

Thus, the sliding portion 147 is biased toward the first groove 132 by the biasing force of the coil spring 146. Thus, as shown in FIGS. 14 and 20, the table 117 is slidably supported by the two first grooves 132 of the base portion 127 of the lid 116 at the sliding portions 147 of the two pairs of sliding mechanisms 142 in the rear portion. When the lid 116 is pivoted again from this state shown in FIG. 20 to the opening position, the lid 116 is changed to the opening position while supporting the table 117 as shown in FIG. 21.

Advantages of Present Embodiment

The above-described embodiment achieves the following advantages.

(1) The console 114 includes the box body 115, the lid 116, and the table 117. The box body 115 includes the upper opening 118 and the inner accommodation portion 119. The lid 116 is pivotably attached to the box body 115 and configured to be pivotable between the closing position, at which the lid 116 closes the upper opening 118, and the opening position, at which the lid 116 opens the upper opening 118. The table 117 is configured to be movable, when the lid 116 is at the closing position, between the accommodation position, at which the table 117 is accommodated and supported by the lid 116, and the usage position, at which the table 117 is pulled out from the lid 116 and supported by the box body 115.

With the above structure, when the table 117 is at the usage position, the table 117 is supported by the box body 115. Thus, even when the table 117 is in use, the lid 116 can be open and closed without interrupting the use of the table 117. In other words, the accommodation portion 119 is accessible while the table 117 is used. Thus, usability of the console 114 is improved.

(2) In the console 114, the lid 116 includes the hinge member 125, pivotably attached to the box body 115, and the lid body 126, attached to the hinge member 125. The lid body 126 is slidably attached to the hinge member 125.

The above structure improves the degree of freedom when the console 114 is used since the position of the lid body 126 can be changed.

(3) The console 114 includes the lock mechanisms 152, restricting pivoting of the lid 116 at the closing position, and the operation portion 159 operated to cancel the state in which pivoting of the lid 116 is restricted by the lock mechanism 152.

With the above structure, the lock mechanisms 152 can restrict pivoting of the lid 116 at the closing position, and the state in which pivoting of the lid 116 at the closing position is restricted by the lock mechanism 152 is canceled by operating the operation portion 159.

(4) In the console 114, the operation portion 159 is arranged above the table 117 at the usage position.

With the above structure, the table 117 at the usage position does not hinder the operation portion 159.

(5) In the console 114, the lock mechanisms 152 are arranged outward from the table 117 at the accommodation position in the vehicle width direction (right-left direction).

With the above structure, when the table 117 moves between the accommodation position and the usage position, the table 117 does not contact the lock mechanisms 152.

(6) In the console 114, the lid 116 includes the first grooves 132 extending straight and slidably supporting the table 117 at the accommodation position. The box body 115 includes the second grooves 123 extending straight and slidably supporting the table 117 at the usage position. When the lid 116 is at the closing position, the first grooves 132 and the second grooves 123 are adjacent to one other on the same straight line.

With the above structure, when the lid 116 is at the closing position, the first grooves 132 and the second grooves 123 are adjacent to one another on the same straight line, allowing smooth handover of the table 117 between the box body 115 and the lid 116.

Modifications

The second embodiment may be modified as follows. In addition, the second embodiment and the following modifications can be combined as long as the combined modifications remain technically consistent with each other.

The lock mechanisms 152 do not need to be arranged outward from the table 117 at the accommodation position in the vehicle width direction (right-left direction).

The operation portion 159 does not have to be arranged above the table 117 at the usage position.

The lock mechanisms 152 and the operation portion 159 may be omitted.

The lid body 126 may be fixed to the hinge member 125.

The console of the second embodiment may be applied to a console installed in a vehicle other than an automobile.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A vehicle console configured to be arranged between adjacent seats in a passenger compartment, the vehicle console comprising:

a box body including an upper opening and an inner accommodation portion;

a lid pivotably attached to the box body and configured to be pivotable between a closing position at which the lid closes the upper opening and an opening position at which the lid opens the upper opening;

a table configured to be movable, when the lid is at the closing position, between an accommodation position at which the table is accommodated and supported by the lid and a usage position at which the table is pulled out from the lid and supported by the box body;

a lock mechanism that restricts pivoting of the lid at the closing position; and an operation portion that is operated to cancel a state in which pivoting of the lid is restricted by the lock mechanism, wherein the operation portion is arranged above the table at the usage position.

2. A vehicle console configured to be arranged between adjacent seats in a passenger compartment, the vehicle console comprising:

a box body including an upper opening and an inner accommodation portion;

a lid pivotably attached to the box body and configured to be pivotable between a closing position at which the lid closes the upper opening and an opening position at which the lid opens the upper opening;

a table configured to be movable, when the lid is at the closing position, between an accommodation position at which the table is accommodated and supported by the lid and a usage position at which the table is pulled out from the lid and supported by the box body;

a lock mechanism that restricts pivoting of the lid at the closing position; and an operation portion that is operated to cancel a state in which pivoting of the lid is restricted by the lock mechanism, wherein the lock mechanism is arranged outward from the table at the accommodation position in a vehicle width direction.

3. A vehicle console configured to be arranged between adjacent seats in a passenger compartment, the vehicle console comprising:

a box body including an upper opening and an inner accommodation portion;

a lid pivotably attached to the box body and configured to be pivotable between a closing position at which the lid closes the upper opening and an opening position at which the lid opens the upper opening; and a table configured to be movable, when the lid is at the closing position, between an accommodation position at which the table is accommodated and supported by the lid and a usage position at which the table is pulled out from the lid and supported by the box body, wherein the lid includes a first groove extending straight and slidably supporting the table at the accommodation position, the box body includes a second groove extending straight and slidably supporting the table at the usage position, and when the lid is at the closing position, the first groove and the second groove are adjacent to each other on a same straight line.

4. The vehicle console according to claim 1, wherein the lid includes a hinge member pivotably attached to the box body, and a lid body attached to the hinge member, and the lid body is slidably attached to the hinge member.

5. The vehicle console according to claim 2, wherein the lid includes a hinge member pivotably attached to the box body, and a lid body attached to the hinge member, and the lid body is slidably attached to the hinge member.

6. The vehicle console according to claim 3, wherein the lid includes a hinge member pivotably attached to the box body, and a lid body attached to the hinge member, and the lid body is slidably attached to the hinge member.

* * * * *